United States Patent
Jung et al.

(10) Patent No.: US 11,122,518 B2
(45) Date of Patent: Sep. 14, 2021

(54) METHOD FOR APPLYING P-MPR AND APPARATUS THEREOF

(71) Applicant: LG ELECTRONICS INC., Seoul (KR)

(72) Inventors: Manyoung Jung, Seoul (KR); Yoonoh Yang, Seoul (KR); Sangwook Lee, Seoul (KR); Suhwan Lim, Seoul (KR); Jinyup Hwang, Seoul (KR); Jongkeun Park, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/836,759

(22) Filed: Mar. 31, 2020

(65) Prior Publication Data
US 2020/0314765 A1    Oct. 1, 2020

(30) Foreign Application Priority Data
Apr. 1, 2019    (KR) .................. 10-2019-0038075

(51) Int. Cl.
*H04W 52/14*    (2009.01)
*H04W 52/34*    (2009.01)
*H04W 52/36*    (2009.01)

(52) U.S. Cl.
CPC ......... *H04W 52/146* (2013.01); *H04W 52/34* (2013.01); *H04W 52/365* (2013.01); *H04W 52/367* (2013.01)

(58) Field of Classification Search
CPC .. H04W 52/367; H04W 52/146; H04W 52/34
USPC .............. 455/522, 69, 452.1, 452.2, 509
See application file for complete search history.

(56) References Cited

U.S. PATENT DOCUMENTS

| | | | |
|---|---|---|---|
| 2007/0259682 A1* | 11/2007 | Kaikkonen ........... | H04W 52/44 455/522 |
| 2014/0187281 A1* | 7/2014 | Faraone .............. | H04W 52/288 455/522 |
| 2016/0323764 A1* | 11/2016 | Montemurro ..... | H04W 52/0251 |
| 2018/0310259 A1* | 10/2018 | Kim ................... | H04W 52/365 |

* cited by examiner

*Primary Examiner* — John J Lee
(74) *Attorney, Agent, or Firm* — Lee, Hong, Degerman, Kang & Waimey

(57) ABSTRACT

There is provided a method for determining an uplink transmit power. The method may performed by a user equipment (UE) and comprise: measuring an uplink duty cycle; comparing the measured uplink duty cycle with a maximum uplink duty cycle; calculating a value for a power management UE maximum power reduction (P-MPR), based on that the measured uplink duty cycle is greater than the maximum uplink duty cycle; and determining the uplink transmit power based on the calculated value for P-MPR.

14 Claims, 16 Drawing Sheets

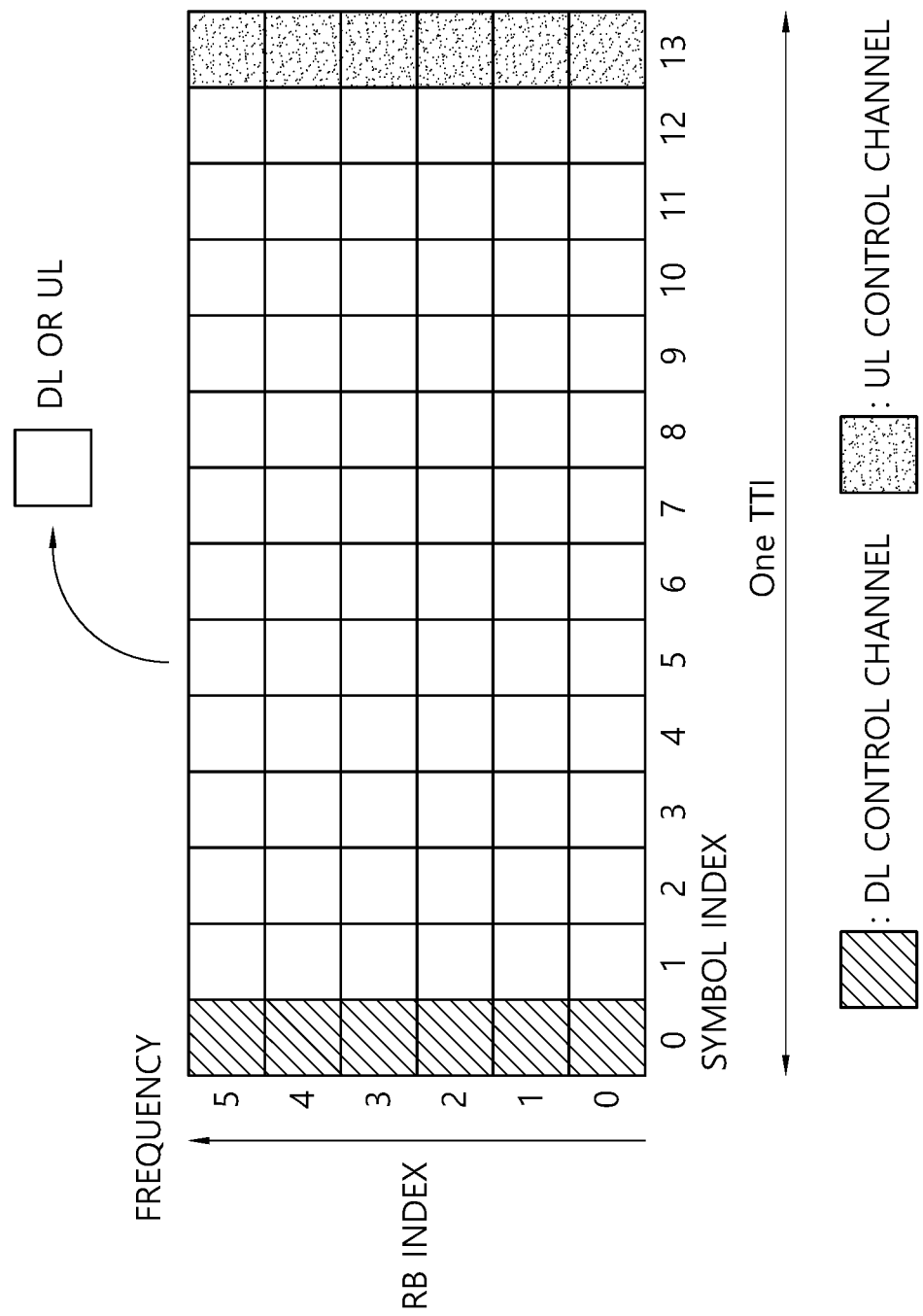

METHOD FOR APPLYING P-MPR AND APPARATUS THEREOF

CROSS-REFERENCE TO RELATED APPLICATIONS

Pursuant to 35 U.S.C. § 119(a), this application claims the benefit of earlier filing date and right of priority to Korean Patent Application No. 10-2019-0038075, filed on Apr. 1, 2019, the contents of which are hereby incorporated by reference herein in its entirety.

TECHNICAL FIELD

The present disclosure relates to mobile communication.

BACKGROUND

With the success in the Evolved Universal Terrestrial Radio Access Network (E-UTRAN) for 4th generation mobile communication, i.e., long term evolution (LTE)/LTE-Advanced (LTE-A), interest in the next-generation, i.e., 5th generation (also known as 5G) mobile communication is rising, and extensive research and development are in process.

A new radio access technology (New RAT or NR) is being researched for the 5th generation (also known as 5G) mobile communication.

A frequency band for NR may be defined as two types (FR1 and FR2) of frequency ranges. FR1 may include a range from 410 MHz to 7125 MHz. That is, FR1 may include a frequency band of 6 GHz or greater (or 5850, 5900, 5925 MHz, or the like). For the convenience of description, FR1 may refer to a "sub-6-GHz range", FR2 may refer to an "above-6-GHz range" and may be referred to as a millimeter wave (mmWave).

High frequencies such as mmWave in FR2 band may conduct a human body.

In order to prevent the high frequencies such as mmWave from conducting the human body, a maximum permissible exposure (MPE) limitation is needed.

SUMMARY

Accordingly, a disclosure of the specification has been made in an effort to solve the aforementioned problem.

In accordance with an embodiment of the present disclosure, a disclosure of this specification provides a method for determining an uplink transmit power. The method may performed by a user equipment (UE) and comprise: measuring an uplink duty cycle; comparing the measured uplink duty cycle with a maximum uplink duty cycle; calculating a value for a power management UE maximum power reduction (P-MPR), based on that the measured uplink duty cycle is greater than the maximum uplink duty cycle; and determining the uplink transmit power based on the calculated value for P-MPR.

The uplink duty cycle represents a percentage of uplink symbols transmitted within a first time period.

The maximum uplink duty cycle represents a radio of uplink symbols within time division duplex (TDD) uplink symbols and downlink symbols.

The calculated value for the P-MPR is applied to satisfy a power exposure requirement.

The method may further comprise: transmitting UE capability information including information on the maximum uplink duty cycle.

The determining the uplink transmit power may include: determining the uplink transmit power; and applying the calculated value for P-MPR to the uplink transmit power.

The applying the value for the P-MPR may include: reducing the value for the P-MPR from the uplink transmit power.

The maximum uplink duty cycle may be defined for a frequency range (FR) 2.

The FR2 may include a n257 band, a n258 band, a n259 band, a n260 band and a n261 band.

In accordance with an embodiment of the present disclosure, a disclosure of this specification provides an apparatus for determining an uplink transmit power. The apparatus may comprise: at least one processor; and at least one computer memory operably connectable to the at least one processor and storing instructions that, when executed by the at least one processor, perform operations comprising: measuring an uplink duty cycle; comparing the measured uplink duty cycle with a maximum uplink duty cycle; calculating a value for a power management UE maximum power reduction (P-MPR), based on that the measured uplink duty cycle is greater than the maximum uplink duty cycle; and determining the uplink transmit power based on the calculated value for P-MPR.

According to a disclosure of the present disclosure, the above problem of the related art is solved.

Effects obtained through specific examples of the present specification are not limited to the effects listed above. For example, there may be a variety of technical effects that a person having ordinary skill in the related art can understand or derive from this specification. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 3 shows an example of subframe type in NR.

DETAILED DESCRIPTION OF THE EMBODIMENTS

Figure 1:
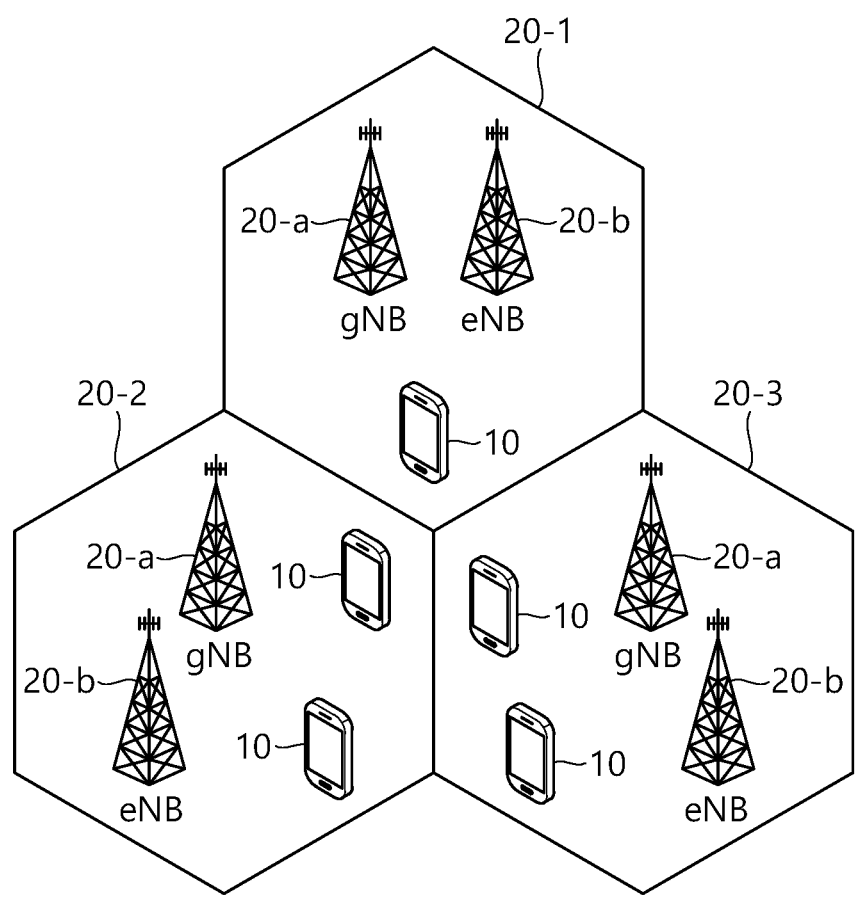
FIG. 1 illustrates a wireless communication system.

Hereinafter, based on 3rd Generation Partnership Project (3GPP) long term evolution (LTE), 3GPP LTE-advanced (LTE-A), 3GPP 5G (5th generation) or 3GPP New Radio (NR), the present specification will be applied. This is just an example, and the present specification may be applied to various wireless communication systems. Hereinafter, LTE includes LTE and/or LTE-A.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

In the appended drawings, although a User Equipment (UE) is illustrated as an example, this is merely an example given to simplify the description of the present disclosure. Herein, a UE may mean to a wireless communication device performing communication in a communication system, such as EPS and/or 5GS, and so on. And, the UE shown in the drawing may also be referred to as a terminal, a mobile equipment (ME), a wireless communication device, a wireless communication apparatus, and so on. Additionally, the UE may be a portable device, such as a laptop computer, a mobile phone, a PDA, a smart phone, a multimedia device, and so on, or the UE may be a non-portable device, such as a personal computer (PC) or a vehicle mounted device.

Although the present disclosure has been described based on a Universal Mobile Telecommunication System (UMTS), an Evolved Packet Core (EPC), and a next generation (also known as 5th generation or 5G) mobile communication network, the present disclosure will be limited only to the aforementioned communication systems and may, therefore, be applied to all communication system and methods to which the technical scope and spirit of the present disclosure can be applied.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

As used herein, 'base station' generally refers to a fixed station that communicates with a wireless device and may be denoted by other terms such as eNB (evolved-NodeB), BTS (base transceiver system), gNB (next-generation NodeB), or access point.

As used herein, 'user equipment (UE)' may be an example of a wireless communication device such as stationary or mobile. Also, UE may be denoted by other terms such as device, wireless device, terminal, MS (mobile station), UT (user terminal), SS (subscriber station), MT (mobile terminal) and etc.

Next-Generation Mobile Communication Network

The following description of this specification may be applied to a next-generation (also known as 5th generation or 5G) mobile communication network.

Thanks to the success of long term evolution (LTE)/LTE-advanced (LTE-A) for 4G mobile communication, interest in the next generation, i.e., 5-generation (so called 5G) mobile communication has been increased and researches have been continuously conducted.

The 5G mobile telecommunications defined by the International Telecommunication Union (ITU) refers to providing a data transmission rate of up to 20 Gbps and a feel transmission rate of at least 100 Mbps or more at any location. The official name is 'IMT-2020' and its goal is to be commercialized worldwide in 2300.

ITU proposes three usage scenarios, for example, enhanced Mobile Broad Band (eMBB) and massive machine type communication (mMTC) and ultra reliable and low latency communications (URLLC).

URLLC relates to usage scenarios that require high reliability and low latency. For example, services such as autonomous navigation, factory automation, augmented reality require high reliability and low latency (e.g., a delay time of 1 ms or less). Currently, the delay time of 4G (LTE) is statistically 21 to 43 ms (best 10%) and 33 to 75 ms (median). This is insufficient to support a service requiring a delay time of 1 ms or less. Next, an eMBB usage scenario relates to a usage scenario requiring a mobile ultra-wideband.

That is, the 5G mobile communication system aims at higher capacity than the current 4G LTE, may increase the density of mobile broadband users, and may support device to device (D2D), high stability and machine type communication (MTC). 5G research and development also aims at a lower latency time and lower battery consumption than a 4G mobile communication system to better implement the Internet of things. A new radio access technology (New RAT or NR) may be proposed for such 5G mobile communication.

FIG. 1 Illustrates a Wireless Communication System

As seen with reference to FIG. 1, the wireless communication system includes at least one base station (BS). The BS is classified into a gNB 20a and an eNB 20b. The gNB 20a is for 5G mobile communication such as NR. And, the eNB 20b is for 4G mobile communication such as LTE or LTE-A.

Each BS (e.g., gNB 20a and eNB 20b) provides a communication service to specific geographical areas (generally, referred to as cells) 20-1, 20-2, and 20-3. The cell can be further divided into a plurality of areas (sectors).

The UE 10 generally belongs to one cell and the cell to which the UE belong is referred to as a serving cell. A BS that provides the communication service to the serving cell is referred to as a serving BS. Since the wireless communication system is a cellular system, another cell that neighbors to the serving cell is present. Another cell which neighbors to the serving cell is referred to a neighbor cell. A BS that provides the communication service to the neighbor cell is referred to as a neighbor BS. The serving cell and the neighbor cell are relatively decided based on the UE.

Hereinafter, a downlink means communication from the BS 20 to the UE 10 and an uplink means communication from the UE 10 to the BS 200. In the downlink, a transmitter may be a part of the BS 20 and a receiver may be a part of the UE 10. In the uplink, the transmitter may be a part of the UE 10 and the receiver may be a part of the BS 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Carrier Aggregation

A carrier aggregation system is now described.

A carrier aggregation system aggregates a plurality of component carriers (CCs). A meaning of an existing cell is changed according to the above carrier aggregation. According to the carrier aggregation, a cell may signify a combination of a downlink component carrier and an uplink component carrier or an independent downlink component carrier.

Further, the cell in the carrier aggregation may be classified into a primary cell, a secondary cell, and a serving cell. The primary cell signifies a cell operated in a primary frequency. The primary cell signifies a cell which UE performs an initial connection establishment procedure or a connection reestablishment procedure or a cell indicated as a primary cell in a handover procedure. The secondary cell signifies a cell operating in a secondary frequency. Once the RRC connection is established, the secondary cell is used to provide an additional radio resource.

As described above, the carrier aggregation system may support a plurality of component carriers (CCs), that is, a plurality of serving cells unlike a single carrier system.

The carrier aggregation system may support a cross-carrier scheduling. The cross-carrier scheduling is a scheduling method capable of performing resource allocation of a PDSCH transmitted through other component carrier through a PDCCH transmitted through a specific component carrier and/or resource allocation of a PUSCH transmitted through other component carrier different from a component carrier basically linked with the specific component carrier.

Introduction of Dual Connectivity (DC)

Recently, a scheme for simultaneously connecting UE to different base stations, for example, a macro cell base station and a small cell base station, is being studied. This is called dual connectivity (DC).

In DC, the eNodeB for the primary cell (Pcell) may be referred to as a master eNodeB (hereinafter referred to as MeNB). In addition, the eNodeB only for the secondary cell (Scell) may be referred to as a secondary eNodeB (hereinafter referred to as SeNB).

A cell group including a primary cell (Pcell) implemented by MeNB may be referred to as a master cell group (MCG) or PUCCH cell group 1. A cell group including a secondary cell (Scell) implemented by the SeNB may be referred to as a secondary cell group (SCG) or PUCCH cell group 2.

Meanwhile, among the secondary cells in the secondary cell group (SCG), a secondary cell in which the UE can transmit Uplink Control Information (UCI), or the secondary cell in which the UE can transmit a PUCCH may be referred to as a super secondary cell (Super SCell) or a primary secondary cell (Primary Scell; PScell).

Figure 2A:
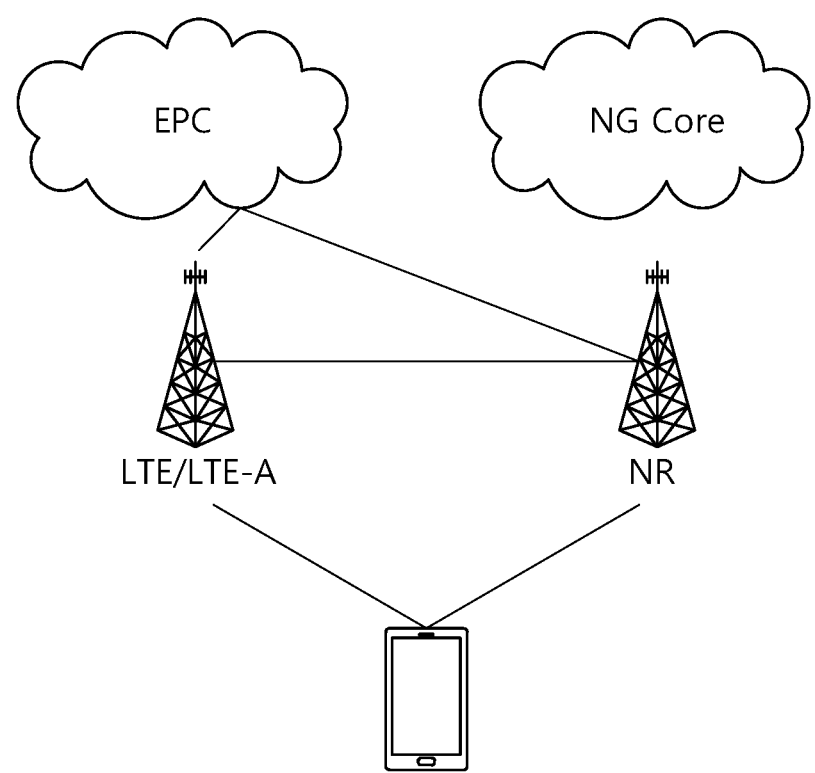
FIGS. 2a to 2c are exemplary diagrams illustrating exemplary architectures for services of the next generation mobile communication.
Figure 2B:
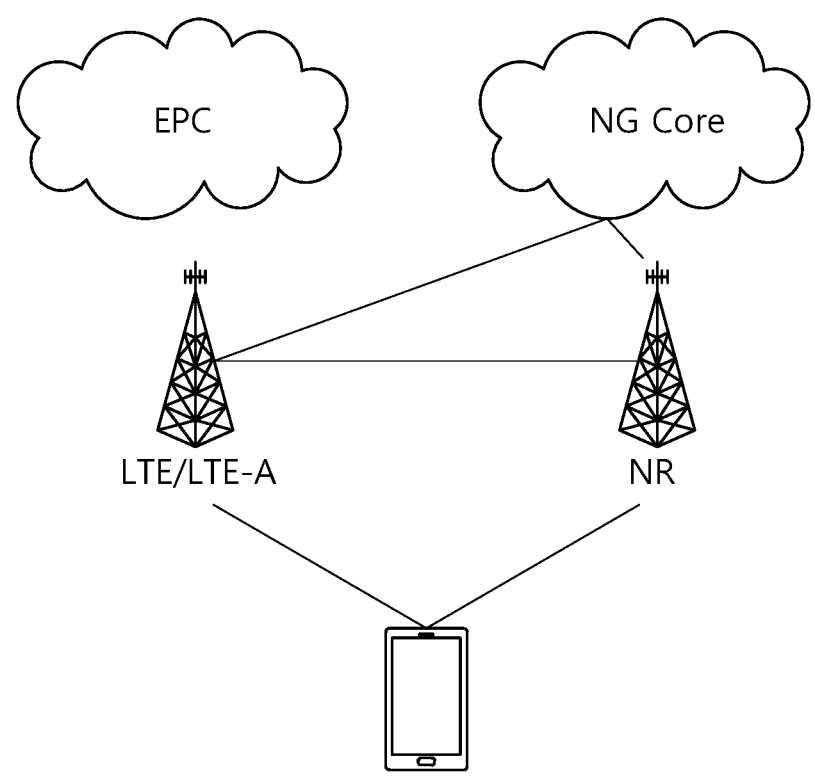
Figure 2C:
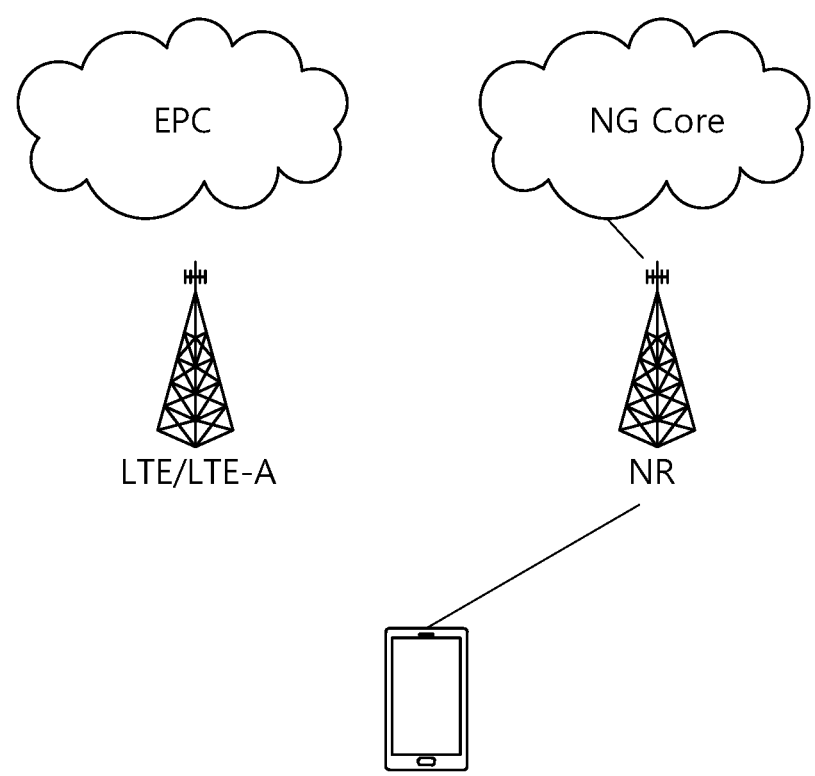

FIGS. 2a to 2c are exemplary diagrams illustrating exemplary architectures for services of the next generation mobile communication.

Referring to FIG. 2a, the UE is connected to LTE/LTE-A based cells and NR based cells in a dual connectivity (DC) manner.

The NR-based cell is connected to a core network for existing 4G mobile communication, that is, an evolved packet core (EPC).

Referring to FIG. 2b, unlike FIG. 2a, the LTE/LTE-A based cell is connected to a core network for the 5G mobile communication, that is, a next generation (NG) core network.

The service scheme based on the architecture as illustrated in FIGS. 2a and 2B is called non-standalone (NSA).

Referring to FIG. 2c, the UE is connected only to NR-based cells. The service method based on such an architecture is called standalone (SA).

On the other hand, in the NR, it may be considered that the reception from the base station uses a downlink subframe, and the transmission to the base station uses an uplink subframe. This method may be applied to paired spectra and unpaired spectra. A pair of spectra means that the two carrier spectra are included for downlink and uplink operations. For example, in a pair of spectra, one carrier may include a downlink band and an uplink band that are paired with each other.

The NR supports a plurality of numerologies (e.g. a plurality of values of subcarrier spacing (SCS)) in order to support various 5G services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

An NR frequency band may be defined as two types (FR1 and FR2) of frequency ranges. The frequency ranges may be changed. For example, the two types (FR1 and FR2) of frequency bands are illustrated in Table 1. For the convenience of description, among the frequency bands used in the NR system, FR1 may refer to a "sub-6-GHz range", FR2 may refer to an "above-6-GHz range" and may be referred to as a millimeter wave (mmWave).

TABLE 1

| Frequency Range Designation | Corresponding Frequency Range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the frequency ranges for the NR system may be changed. For example, FR1 may include a range from 410 MHz to 7125 MHz as illustrated in Table 2. That is, FR1 may include a frequency band of 6 GHz or greater (or 5850, 5900, 5925 MHz, or the like). For example, the frequency band of 6 GHz or greater (or 5850, 5900, 5925 MHz or the like) included in FR1 may include an unlicensed band. The unlicensed band may be used for various uses, for example, for vehicular communication (e.g., autonomous driving).

TABLE 2

| Frequency Range Designation | Corresponding Frequency Range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Operating Band in NR

An operating band in NR is as follows.

Table 3 shows examples of operating bands on FR1. Operating bands shown in Table 3 is a reframing operating band that is transitioned from an operating band of LTE/LTE-A. This operating band may be referred to as FR1 operating band.

TABLE 3

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n20 | 832 MHz-862 MHz | 791 MHz-821 MHz | FDD |
| n28 | 703 MHz-748 MHz | 758 MHz-803 MHz | FDD |
| n38 | 2570 MHz-2620 MHz | 2570 MHz-2620 MHz | TDD |
| n41 | 2496 MHz-2690 MHz | 2496 MHz-2690 MHz | TDD |
| n50 | 1432 MHz-1517 MHz | 1432 MHz-1517 MHz | TDD |
| n51 | 1427 MHz-1432 MHz | 1427 MHz-1432 MHz | TDD |
| n66 | 1710 MHz-1780 MHz | 2110 MHz-2200 MHz | FDD |
| n70 | 1695 MHz-1710 MHz | 1995 MHz-2300 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |

Table 4 shows examples of operating bands on FR2. The following table shows operating bands defined on a high frequency. This operating band is referred to as FR2 operating band.

TABLE 4

| NR operating band | Uplink (UL) operating band $F_{UL\_low}$-$F_{UL\_high}$ | Downlink (DL) operating band $F_{DL\_low}$-$F_{DL\_high}$ | Duplex mode |
|---|---|---|---|
| n257 | 26500 MHz-29500 MHz | 26500 MHz-29500 MHz | TDD |
| n258 | 24250 MHz-27500 MHz | 24250 MHz-27500 MHz | TDD |
| n260 | 37000 MHz-40000 MHz | 37000 MHz-40000 MHz | TDD |
| n261 | 27500 MHz-283500 MHz | 27500 MHz-283500 MHz | TDD |

Meanwhile, when the operating band shown in the above table is used, a channel bandwidth is used as shown in the following table.

TABLE 5

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ | 60 MHz $N_{RB}$ | 80 MHz $N_{RB}$ | 100 MHz $N_{RB}$ |
|---|---|---|---|---|---|---|---|---|---|---|---|
| 15 | 25 | 52 | 79 | 106 | 133 | [160] | 216 | 270 | N/A | N/A | N/A |
| 30 | 11 | 24 | 38 | 51 | 65 | [78] | 106 | 133 | 162 | 217 | 273 |
| 60 | N/A | 11 | 18 | 24 | 31 | [38] | 51 | 65 | 79 | 107 | 135 |

In the above table, SCS indicates a subcarrier spacing. In the above table, $N_{RB}$ indicates the number of RBs.

Meanwhile, when the operating band shown in the above table is used, a channel bandwidth is used as shown in the following table.

TABLE 6

| SCS (kHz) | 50 MHz $N_{RB}$ | 100 MHz $N_{RB}$ | 200 MHz $N_{RB}$ | 400 MHz $N_{RB}$ |
|---|---|---|---|---|
| 60 | 66 | 132 | 264 | N.A |
| 120 | 32 | 66 | 132 | 264 |

FIG. 3 Shows an Example of Subframe Type in NR

Figure 4:
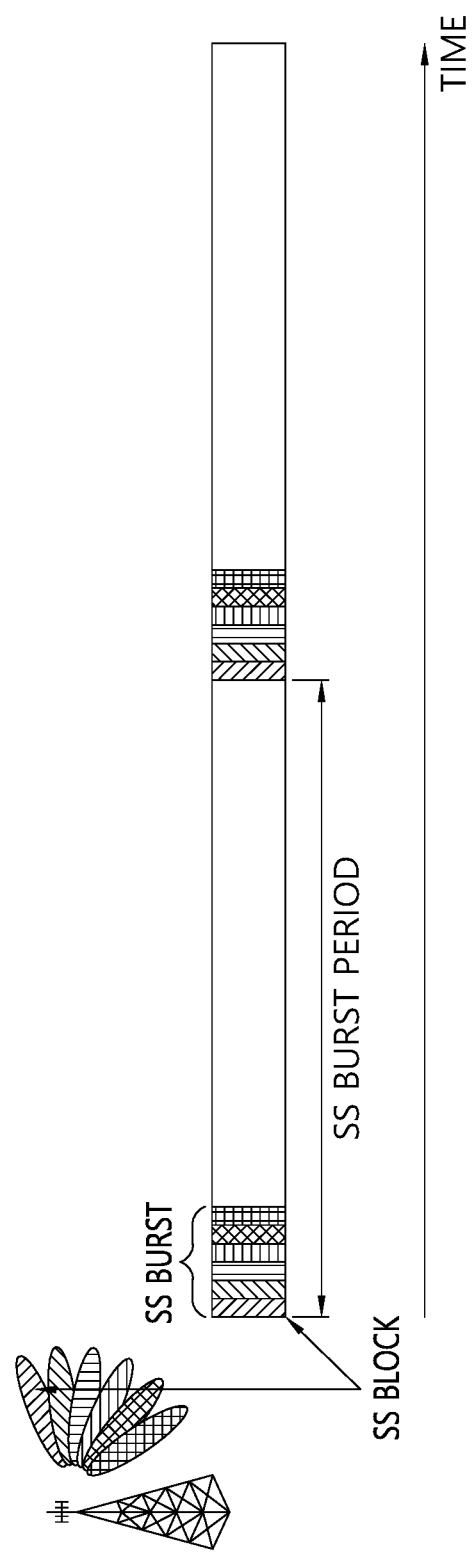
FIG. 4 is an exemplary diagram illustrating an example of an SS block in NR.
Figure 5:
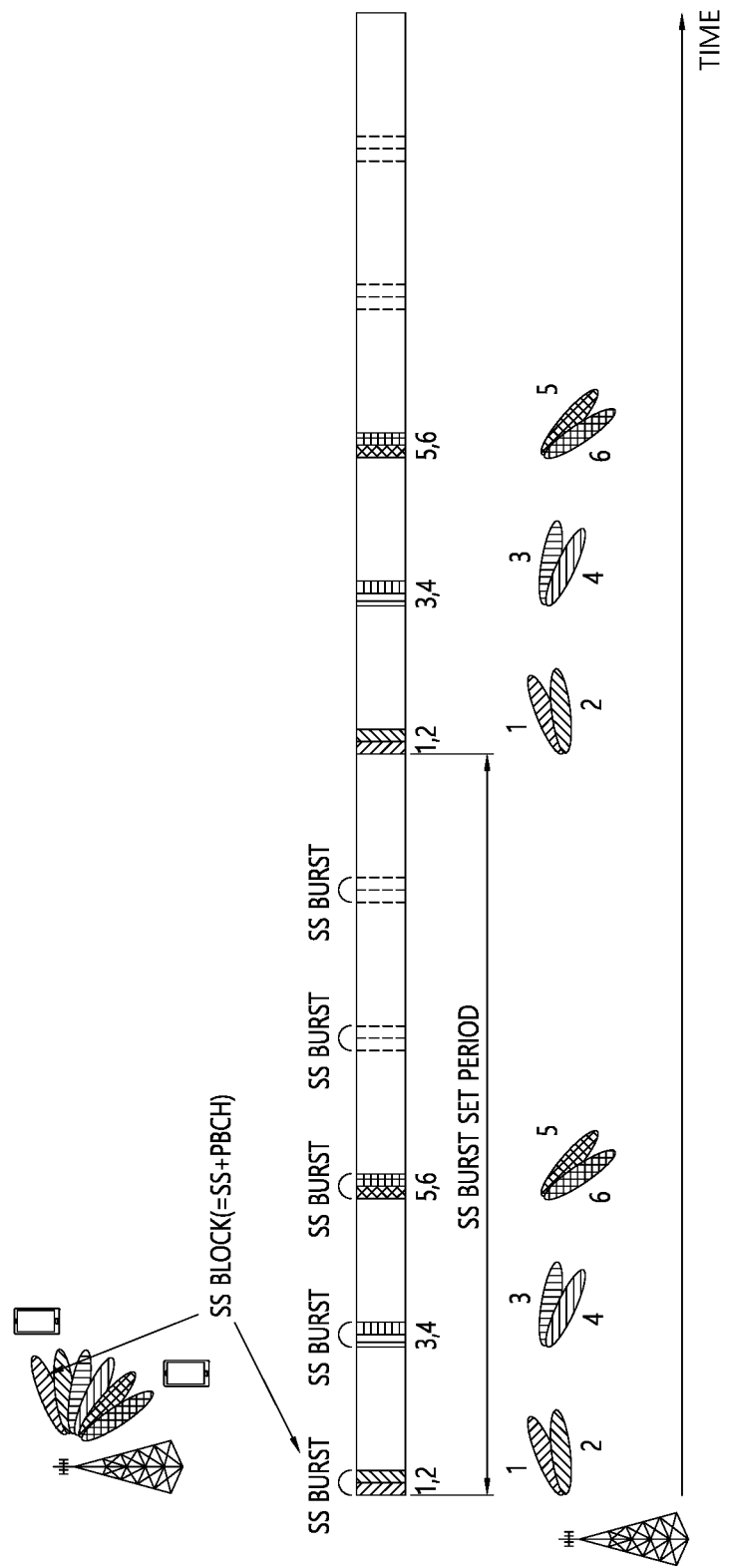
FIG. 5 is an exemplary diagram illustrating an example of beam sweeping in NR.

A transmission time interval (TTI) shown in FIG. 5 may be called a subframe or slot for NR (or new RAT). The subframe (or slot) in FIG. 5 may be used in a TDD system of NR (or new RAT) to minimize data transmission delay. As shown in FIG. 4, a subframe (or slot) includes 14 symbols as does the current subframe. A front symbol of the subframe (or slot) may be used for a downlink control channel, and a rear symbol of the subframe (or slot) may be used for a uplink control channel. Other channels may be used for downlink data transmission or uplink data transmission. According to such structure of a subframe (or slot), downlink transmission and uplink transmission may be performed sequentially in one subframe (or slot). Therefore, a downlink data may be received in the subframe (or slot), and a uplink acknowledge response (ACK/NACK) may be transmitted in the subframe (or slot). A subframe (or slot) in this structure may be called a self-constrained subframe. If this structure of a subframe (or slot) is used, it may reduce time required to retransmit data regarding which a reception error occurred, and thus, a final data transmission waiting time may be minimized. In such structure of the self-contained subframe (slot), a time gap may be required for transition from a transmission mode to a reception mode or vice versa.

To this end, when downlink is transitioned to uplink in the subframe structure, some OFDM symbols may be set as a Guard Period (GP).

Support of Various Numerologies

In the next generation system, with development of wireless communication technologies, a plurality of numerologies may be provided to a UE.

The numerologies may be defined by a length of cycle prefix (CP) and a subcarrier spacing. One cell may provide a plurality of numerology to a UE. When an index of a numerology is represented by μ, a subcarrier spacing and a corresponding CP length may be expressed as shown in the following table.

TABLE 7

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

In the case of a normal CP, when an index of a numerology is expressed by μ, the number of OLDM symbols per slot $N^{slot}_{symb}$, the number of slots per frame Nframe, μslot, and the number of slots per subframe Nsubframe, μslot are expressed as shown in the following table.

TABLE 8

| μ | $N^{slot}_{symb}$ | $N^{frame, \mu}_{slot}$ | $N^{subframe, \mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the case of an extended CP, when an index of a numerology is represented by μ, the number of OLDM symbols per slot $N^{slot}_{symb}$, the number of slots per frame Nframe, μslot, and the number of slots per subframe Nsubframe, μslot are expressed as shown in the following table.

TABLE 9

| M | $N^{slot}_{symb}$ | $N^{frame, \mu}_{slot}$ | $N^{subframe, \mu}_{slot}$ |
|---|---|---|---|
| 2 | 12 | 40 | 4 |

Meanwhile, in the next-generation mobile communication, each symbol may be used for downlink or uplink, as shown in the following table. In the following table, uplink is indicated by U, and downlink is indicated by D. In the following table, X indicates a symbol that can be flexibly used for uplink or downlink.

TABLE 10

| | Symbol Number in Slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | D | X | X | X | X | X | U | U | U |
| 45 | D | D | D | D | D | D | X | X | U | U | U | U | U | U |
| 46 | D | D | D | D | X | D | D | D | D | D | D | D | D | X |
| 47 | D | D | D | D | X | D | D | D | D | D | D | D | X | X |
| 48 | D | X | X | X | X | X | D | X | X | X | X | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | U | X | X | X | X | U | U | U |
| 54 | D | D | D | D | D | X | U | D | D | D | D | D | X | U |
| 55 | D | D | X | U | U | U | U | D | D | X | U | U | U | U |
| 56 | D | X | U | U | U | U | U | D | X | U | U | U | U | U |
| 57 | D | D | D | D | X | X | U | D | D | D | D | X | X | U |
| 58 | D | D | X | X | U | U | U | D | D | X | X | U | U | U |
| 59 | D | X | X | U | U | U | U | D | X | X | U | U | U | U |
| 60 | D | X | X | X | X | X | U | D | X | X | X | X | X | U |
| 61 | D | D | X | X | X | X | U | D | D | X | X | X | X | U |

SS Block in NR

In 5G NR, the UE defines a physical block channel (PBCH) including information required to perform an initial access, that is, a master information block (MIB) and a synchronization signal SS (including PSS and SSS). In addition, a plurality of SS blocks are bound to be defined as an SS burst, and a plurality of SS bursts are bound to be defined as an SS burst set. Each SS block is assumed to be beamformed in a specific direction, and several SS blocks in the SS burst set are designed to support UEs in different directions.

FIG. 4 is an Exemplary Diagram Illustrating an Example of an SS Block in NR

Referring to FIG. 4, the SS burst is transmitted every predetermined periodicity. Therefore, the UE receives the SS block and performs cell detection and measurement.

On the other hand, in 5G NR, beam sweeping is performed on the SS. Hereinafter, it will be described with reference to FIG. 5.

FIG. 5 is an Exemplary Diagram Illustrating an Example of Beam Sweeping in NR

The base station transmits each SS block in the SS burst with beam sweeping over time. At this time, the SS blocks in the SS burst set are transmitted in order to support UEs existing in different directions. In FIG. 5, the SS burst set includes SS blocks 1 to 6, and each SS burst includes two SS blocks.

Channel Raster and Sync Raster

Hereinafter, a channel raster and a sync raster will be described.

A frequency channel raster is defined as a set of RF reference frequencies ($F_{REF}$). The RF reference frequency may be used as a signal for indicating the position of an RF channel, an SS block, and the like.

The global frequency raster is defined for all frequencies of 0 to 100 GHz. The unit of the global frequency raster is denoted by $\Delta F_{Global}$.

The RF reference frequency is specified by an NR absolute radio frequency channel number (NR-ARFCN) in the range of the global frequency raster (0 . . . 2016666). The relationship between the NR-ARFCN and the RF reference frequency $F_{REF}$ of MHz may be expressed by the following Equation. Here, $F_{REF-Offs}$ and $N_{Ref-Offs}$ are shown in the following Table.

$$F_{REF}=F_{REF-Offs}+\Delta F_{Global}(N_{REF}-N_{REF-Offs}) \quad \text{[Equation 1]}$$

TABLE 11

| Frequency range (MHz) | $\Delta F_{Global}$ (kHz) | $F_{REF-Offs}$ (MHz) | $N_{REF-Offs}$ | Range of $N_{REF}$ |
|---|---|---|---|---|
| 0-3000 | 5 | 0 | 0 | 0-599999 |
| 3000-24250 | 15 | 3000 | 600000 | 600000-2016666 |
| 24250-100000 | 60 | 24250.08 | 2016667 | 2016667-3279165 |

The channel raster represents a subset of RF reference frequencies that may be used to identify RF channel locations in the uplink and downlink. The RF reference frequency for the RF channel may be mapped to a resource element on the carrier.

The mapping between the RF reference frequency of the channel raster and the corresponding resource element may be used to identify an RF channel location. The mapping depends on the total number of RBs allocated to the channel and is applies to both UL and DL.

In the case of $N_{RB}$ mod 2=0,
an RE index k is 0, and
the PRB number is as follows.

$$n_{PRB} = \left\lfloor \frac{N_{RB}}{2} \right\rfloor$$

In the case of $N_{RB}$ mod 2=1,
an RE index k is 6, and
the PRB number is as follows.

$$n_{PRB} = \left\lfloor \frac{N_{RB}}{2} \right\rfloor$$

The RF channel location of the channel raster on each NR operating band may be represented as shown in the following Table.

TABLE 12

| NR operating band | $\Delta F_{Raster}$ (kHz) | Uplink frequency range of $N_{REF}$ (First-<Step size>-Last) | Downlink frequency range of $N_{REF}$ (First-<Step size>-Last) |
|---|---|---|---|
| n1 | 100 | 384000-<20>-396000 | 422000-<20>-434000 |
| n2 | 100 | 370000-<20>-382000 | 386000-<20>-398000 |
| n3 | 100 | 342000-<20>-357000 | 361000-<20>-376000 |
| n5 | 100 | 164800-<20>-169800 | 173800-<20>-178800 |
| n7 | 100 | 500000-<20>-514000 | 524000-<20>-538000 |
| n8 | 100 | 176000-<20>-183000 | 185000-<20>-192000 |
| n12 | 100 | 139800-<20>-143200 | 145800-<20>-149200 |
| n20 | 100 | 166400-<20>-172400 | 158200-<20>-164200 |
| n25 | 100 | 370000-<20>-383000 | 386000-<20>-399000 |
| n28 | 100 | 140600-<20>-149600 | 151600-<20>-160600 |
| n34 | 100 | 402000-<20>-405000 | 402000-<20>-405000 |
| n38 | 100 | 514000-<20>-524000 | 514000-<20>-524000 |
| n39 | 100 | 376000-<20>-384000 | 376000-<20>-384000 |
| n40 | 100 | 460000-<20>-480000 | 460000-<20>-480000 |
| n41 | 15 | 499200-<3>-537999 | 499200-<3>-537999 |
| | 30 | 499200-<6>-537996 | 499200-<6>-537996 |
| n51 | 100 | 285400-<20>-286400 | 285400-<20>-286400 |
| n66 | 100 | 342000-<20>-356000 | 422000-<20>-440000 |
| n70 | 100 | 339000-<20>-342000 | 399000-<20>-404000 |
| n71 | 100 | 132600-<20>-139600 | 123400-<20>-130400 |
| n75 | 100 | N/A | 286400-<20>-303400 |
| n76 | 100 | N/A | 285400-<20>-286400 |
| n77 | 15 | 620000-<1>-680000 | 620000-<1>-680000 |
| | 30 | 620000-<2>-680000 | 620000-<2>-680000 |
| n78 | 15 | 620000-<1>-653333 | 620000-<1>-653333 |
| | 30 | 620000-<2>-653332 | 620000-<2>-653332 |
| n79 | 15 | 693334-<1>-733333 | 693334-<1>-733333 |
| | 30 | 693334-<2>-733332 | 693334-<2>-733332 |
| n80 | 100 | 342000-<20>-357000 | N/A |
| n81 | 100 | 176000-<20>-183000 | N/A |
| n82 | 100 | 166400-<20>-172400 | N/A |
| n83 | 100 | 140600-<20>-149600 | N/A |
| n84 | 100 | 384000-<20>-396000 | N/A |
| n86 | 100 | 342000-<20>-356000 | N/A |

TABLE 13

| NR operating band | $\Delta F_{Raster}$ (kHz) | Uplink and downlink frequency range (First-<Step size>-Last) |
|---|---|---|
| n257 | 60 | 2054166-<1>-2104165 |
| | 120 | 2054167-<2>-2104165 |
| n258 | 60 | 2016667-<1>-2070832 |
| | 120 | 2016667-<2>-2070831 |
| n260 | 60 | 2229166-<1>-2279165 |
| | 120 | 2229167-<2>-2279165 |
| n261 | 60 | 2070833-<1>-2084999 |
| | 120 | 2070833-<2>-2087497 |

On the other hand, the sync raster represents the frequency location of the SS block used to obtain system information by the UE. The frequency location of the SS block may be defined as $SS_{REF}$ using the corresponding GSCN number.

A global synchronization raster is defined for all frequencies. The frequency position of the SS block is defined as $SS_{REF}$ with corresponding number GSCN. The parameters defining the $SS_{REF}$ and GSCN for all the frequency ranges are shown in below table.

The synchronization raster and the subcarrier spacing of the synchronization block is defined separately for each band.

Below table shows GSCN parameters for the global frequency raster.

TABLE 14

| Frequency range | SS Block frequency position $SS_{REF}$ | GSCN | Range of GSCN |
|---|---|---|---|
| 0-3000 MHz | N * 1200 kHz + M * 50 kHz, N = 1:2499, M ∈ {1, 3, 5} (Note 1) | 3N + (M − 3)/2 | 2-7498 |
| 3000-24250 MHz | 3000 MHz + N * 1.44 MHz N = 0:14756 | 7499 + N | 7499-22255 |

NOTE 1:
The default value for operating bands with SCS spaced channel raster is M = 3.

The synchronization raster for each band is give in below table. The distance between applicable GSCN entries is given by the <Step size> indicated in below table.

TABLE 15

| NR operating band | SS Block SCS | Range of GSCN (First-<Step size>-Last) |
| --- | --- | --- |
| n1 | 15 kHz | 5279-<1>-5419 |
| n2 | 15 kHz | 4829-<1>-4969 |
| n3 | 15 kHz | 4517-<1>-4693 |
| n5 | 15 kHz | 2177-<1>-2230 |
|  | 30 kHz | 2183-<1>-2224 |
| n7 | 15 kHz | 6554-<1>-6718 |
| n8 | 15 kHz | 2318-<1>-2395 |
| n12 | 15 kHz | 1828-<1>-1858 |
| n20 | 15 kHz | 1982-<1>-2047 |
| n25 | 15 kHz | 4829-<1>-4981 |
| n28 | 15 kHz | 1901-<1>-2002 |
| n34 | 15 kHz | 5030-<1>-5056 |
| n38 | 15 kHz | 6431-<1>-6544 |
| n39 | 15 kHz | 4706-<1>-4795 |
| n40 | 15 kHz | 5756-<1>-5995 |
| n41 | 15 kHz | 6246-<3>-6717 |
|  | 30 kHz | 6252-<3>-6714 |
| n50 | 15 kHz | 3584-<1>-3787 |
| n51 | 15 kHz | 3572-<1>-3574 |
| n66 | 15 kHz | 5279-<1>-5494 |
|  | 30 kHz | 5285-<1>-5488 |
| n70 | 15 kHz | 4993-<1>-5044 |
| n71 | 15 kHz | 1547-<1>-1624 |
| n74 | 15 kHz | 3692-<1>-3790 |
| n75 | 15 kHz | 3584-<1>-3787 |
| n76 | 15 kHz | 3572-<1>-3574 |
| n77 | 30 kHz | 7711-<1>-8329 |
| n78 | 30 kHz | 7711-<1>-8051 |
| n79 | 30 kHz | 8480-<16>-8880 |

Maximum Output Power

Power class 1, 2, 3, and 4 are specified based on UE types as follows:

TABLE 16

| UE Power class | UE type |
| --- | --- |
| 1 | Fixed wireless access (FWA) UE |
| 2 | Vehicular UE |
| 3 | Handheld UE |
| 4 | High power non-handheld UE |

1. UE Maximum Output Power for Power Class 1

The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of effective isotropic radiated power (EIRP) (Link=Beam peak search grids, Meas=Link angle).

Below table shows UE minimum peak EIRP for power class 1.

TABLE 17

| Operating band | Min peak EIRP (dBm) |
| --- | --- |
| n257 | 40.0 |
| n258 | 40.0 |

TABLE 17-continued

| Operating band | Min peak EIRP (dBm) |
| --- | --- |
| n260 | 38.0 |
| n261 | 40.0 |

The maximum output power values for total radiated power (TRP) and EIRP are found in below table. The maximum allowed EIRP is derived from regulatory requirements. The requirements are verified with the test metrics of TRP (Link=TX beam peak direction) in beam locked mode and EIRP (Link=TX beam peak direction, Meas=Link angle).

Below table shows UE maximum output power limits for power class 1.

TABLE 18

| Operating band | Max TRP (dBm) | Max EIRP (dBm) |
| --- | --- | --- |
| n257 | 35 | 55 |
| n258 | 35 | 55 |
| n260 | 35 | 55 |
| n261 | 35 | 55 |

The minimum EIRP at the 85th percentile of the distribution of radiated power measured over the full sphere around the UE is defined as the spherical coverage requirement and is found in below table. The requirement is verified with the test metric of EIRP (Link=Beam peak search grids, Meas=Link angle).

Below table shows UE spherical coverage for power class 1.

TABLE 19

| Operating band | Min EIRP at 85%-tile CDF (dBm) |
| --- | --- |
| n257 | 32.0 |
| n258 | 32.0 |
| n260 | 30.0 |
| n261 | 32.0 |

2. UE Maximum Output Power for Power Class 2

The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of EIRP (Link=Beam peak search grids, Meas=Link angle).

Below table shows UE minimum peak EIRP for power class 2.

TABLE 20

| Operating band | Min peak EIRP (dBm) |
| --- | --- |
| n257 | 29 |
| n258 | 29 |
| n261 | 29 |

The maximum output power values for TRP and EIRP are found in below table. The maximum allowed EIRP is derived from regulatory requirements [8]. The requirements are verified with the test metrics of TRP (Link=TX beam peak direction) in beam locked mode and EIRP (Link=TX beam peak direction, Meas=Link angle).

Below table shows UE maximum output power limits for power class 2.

TABLE 21

| Operating band | Max TRP (dBm) | Max EIRP (dBm) |
|---|---|---|
| n257 | 23 | 43 |
| n258 | 23 | 43 |
| n261 | 23 | 43 |

The minimum EIRP at the 60th percentile of the distribution of radiated power measured over the full sphere around the UE is defined as the spherical coverage requirement and is found in below table. The requirement is verified with the test metric of EIRP (Link=Beam peak search grids, Meas=Link angle).

Below table shows UE spherical coverage for power class 2.

TABLE 22

| Operating band | Min EIRP at 60%-tile CDF (dBm) |
|---|---|
| n257 | 18.0 |
| n258 | 18.0 |
| n261 | 18.0 |

3. UE Maximum Output Power for Power Class 3

The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of total component of EIRP (Link=Beam peak search grids, Meas=Link angle). The requirement for the UE which supports a single FR2 band is specified in below table. The requirement for the UE which supports multiple FR2 bands is specified in both below tables.

Below table shows UE minimum peak EIRP for power class 3.

TABLE 23

| Operating band | Min peak EIRP (dBm) |
|---|---|
| n257 | 22.4 |
| n258 | 22.4 |
| n259 | 18.7 |
| n260 | 20.6 |
| n261 | 22.4 |

The maximum output power values for TRP and EIRP are found on the below table. The max allowed EIRP is derived from regulatory requirements [8]. The requirements are verified with the test metrics of TRP (Link=TX beam peak direction) in beam locked mode and the total component of EIRP (Link=TX beam peak direction, Meas=Link angle).

Below table shows UE maximum output power limits for power class 3

TABLE 24

| Operating band | Max TRP (dBm) | Max EIRP (dBm) |
|---|---|---|
| n257 | 23 | 43 |
| n258 | 23 | 43 |
| n259 | 23 | 43 |
| n260 | 23 | 43 |
| n261 | 23 | 43 |

The minimum EIRP at the 50th percentile of the distribution of radiated power measured over the full sphere around the UE is defined as the spherical coverage requirement and is found in below table. The requirement is verified with the test metric of the total component of EIRP (Link=Beam peak search grids, Meas=Link angle). The requirement for the UE which supports a single FR2 band is specified in the below table. The requirement for the UE which supports multiple FR2 bands is specified in both below tables.

Below table shows UE spherical coverage for power class 3.

TABLE 25

| Operating band | Min EIRP at 50%-tile CDF (dBm) |
|---|---|
| n257 | 11.5 |
| n258 | 11.5 |
| n259 | 5.8 |
| n260 | 8 |
| n261 | 11.5 |

For the UEs that support multiple FR2 bands, minimum requirement for peak EIRP and EIRP spherical coverage in above tables shall be decreased per band, respectively, by the peak EIRP relaxation parameter $\Delta MB_{P,n}$ and EIRP spherical coverage relaxation parameter $\Delta MB_{S,n}$. For each combination of supported bands $\Delta MB_{P,n}$ and $\Delta MB_{S,n}$ apply to each supported band n, such that the total relaxations, $\Sigma MB_P$ and $\Sigma MB_S$, across all supported bands shall not exceed the total value indicated in the below table.

Below table shows UE multi-band relaxation factors for power class 3.

TABLE 26

| Supported bands | ΣMBP (dB) | ΣMBS (dB) |
|---|---|---|
| n257, n258 | ≤1.3 | ≤1.25 |
| n257, n260 | ≤1.0 | ≤0.753 |
| n258, n260 | | |
| n257, n261 | 0.0 | 0.0 |
| n258, n261 | ≤1.0 | ≤1.25 |
| n260, n261 | 0.0 | ≤0.752 |
| n257, n258, n260 | ≤1.7 | ≤1.753 |
| n257, n258, n261 | | |
| n257, n258, n260, n261 | | |
| n257, n260, n261 | ≤0.5 | ≤1.253 |
| n258, n260, n261 | ≤1.5 | ≤1.253 |

4. UE Maximum Output Power for Power Class 4

The following requirements define the maximum output power radiated by the UE for any transmission bandwidth within the channel bandwidth for non-CA configuration, unless otherwise stated. The period of measurement shall be at least one sub frame (1 ms). The requirement is verified with the test metric of EIRP (Link=Beam peak search grids, Meas=Link angle).

Below table shows UE minimum peak EIRP for power class 4.

TABLE 27

| Operating band | Min peak EIRP (dBm) |
| --- | --- |
| n257 | 34 |
| n258 | 34 |
| n260 | 31 |
| n261 | 34 |

The maximum output power values for TRP and EIRP are found in the below table. The maximum allowed EIRP is derived from regulatory requirements [8]. The requirements are verified with the test metrics of TRP (Link=TX beam peak direction) in beam locked mode and EIRP (Link=TX beam peak direction, Meas=Link angle).

Below table shows UE maximum output power limits for power class 4.

TABLE 28

| Operating band | Max TRP (dBm) | Max EIRP (dBm) |
| --- | --- | --- |
| n257 | 23 | 43 |
| n258 | 23 | 43 |
| n260 | 23 | 43 |
| n261 | 23 | 43 |

The minimum EIRP at the $20^{th}$ percentile of the distribution of radiated power measured over the full sphere around the UE is defined as the spherical coverage requirement and is found in the below table. The requirement is verified with the test metric of EIRP (Link=Beam peak search grids, Meas=Link angle).

Below table shows UE spherical coverage for power class 4.

TABLE 29

| Operating band | Min EIRP at 20%-tile CDF (dBm) |
| --- | --- |
| n257 | 25 |
| n258 | 25 |
| n260 | 19 |
| n261 | 25 |

Disclosure of the Present Disclosure

Figure 6:
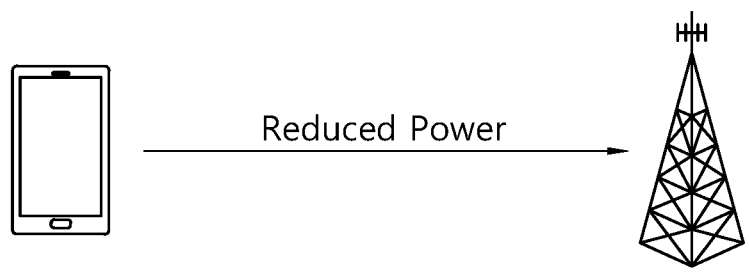
FIG. 6 illustrates an example of a method of limiting transmission power of a wireless device.

FIG. 6 Illustrates an Example of a Method of Limiting Transmission Power of a Wireless Device As can be seen from FIG. 6, the wireless device (or UE) 100 transmits a signal at a power reduced by a value of a maximum power reduction (MPR).

Meanwhile, high frequencies such as mmWave in FR2 band of Table 4 may conduct a human body.

In order to prevent the high frequencies such as mmWave from conducting the human body, a maximum permissible exposure (MPE) limitation is needed.

The MPE limitation may be satisfied by either a power management UE maximum power reduction (P-MPR) or a maximum uplink duty cycle or by both of them.

The maximum uplink duty cycle means a percentage of uplink symbols transmitted within any is evaluation period. That is, the maximum uplink duty cycle means a radio of uplink symbols within time division duplex (TDD) uplink symbols and downlink symbols.

Figure 7:
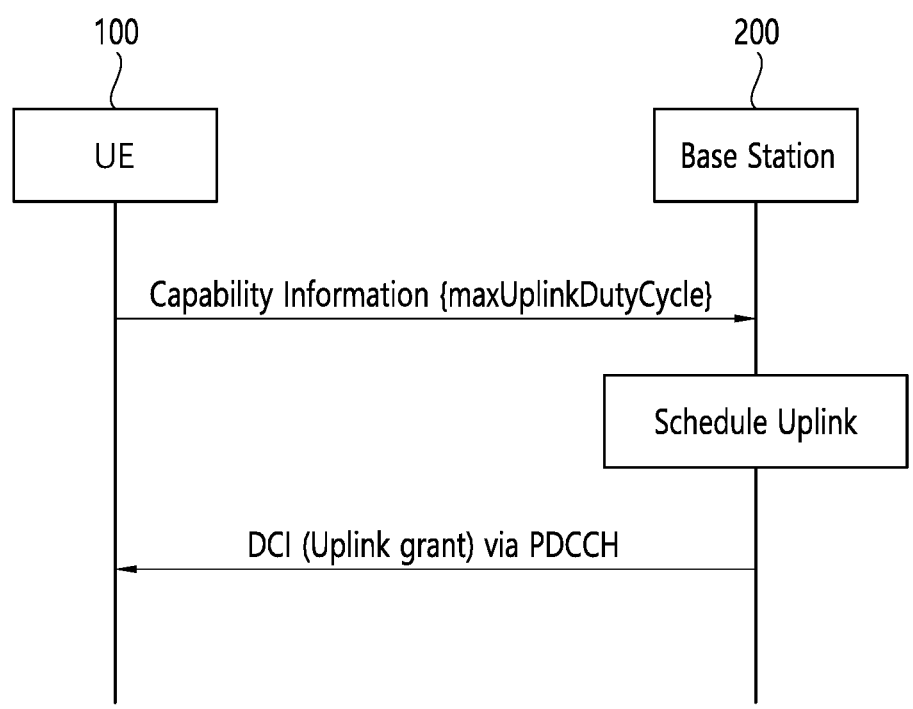
FIG. 7 shows an exemplary flow for transmitting capability information.

FIG. 7 Shows an Exemplary Flow for Transmitting Capability Information

Referring to FIG. 7, the wireless device (e.g., UE) 100 transmits capability information including the maximum uplink duty cycle to a base station (e.g., gNB) 200.

The base station (e.g., gNB) 200 performs an uplink scheduling based on the capability information of the wireless device (e.g., UE) 100. In other words, the base station (e.g., gNB) 200 allocates uplink resources where the wireless device (e.g., UE) 100 transmits a PUSCH signal.

And then, the base station (e.g., gNB) 200 transmits downlink control information (DCI) including an uplink grant via a PDCCH. Here, the uplink grant includes information on the allocated uplink resources based on the uplink scheduling.

It is required to define the Maximum permissible Exposure limitation at mmWave using P-MPR or the restricted maxUplinkDutyCycle or both P-MPR and maxUplinkDutyCycle restriction.

However, the required P-MPR level has not been studied and there was no candidate percentile of maxUplinkDutyCycle to satisfy the MPE regulatory requirements and SAR limitation at both FR1 and FR2.

Therefore, the present specification provides test results for SAR and MPE for both NSA and SA NR UE. Also, the present specification proposes candidate solution to satisfy the basic restriction of human exposure at both FR1 and FR2.

It is considerable to remove the P-MPR upper limitation to compliance the Maximum permissible Exposure limitation at mmWave using P-MPR or the restricted maxUplinkDutyCycle or both P-MPR and maxUplinkDutyCycle restriction.

On the other hand, if the wireless device may not transmit the capability information including the maximum uplink duty cycle, a problem occurs that the base station could not limit the percentage of uplink symbols transmitted within the given period.

In other word, a default value of maxUplinkDutyCycle has not been provided when the UE did not report the signalling of maxUplinkDutyCycle level to satisfy the MPE regulatory requirements at FR2.

Therefore, the present disclosure provides measured results for MPE for both NSA and SA NR UE. Also the present disclosure proposes the default value of maxUplinkDutyCycle to guarantee the network coverage without P-MPR which was same principle to decide maxUplinkDutyCycle at FR1. Also, this proposal can minimize the human exposure impact when early released UE did not report the maxUplinkDutyCycle to network at FR2.

1 MPE Measurements for SA UE at mmWave

The updated FCC and ICNIRP limitations are introduced in below table, which shows general public RF Maximum Permissible Exposure limits above the frequency $f_{tr}$ (f=frequency in GHz).

TABLE 30

|  | FCC | | ICNIRP | |
| --- | --- | --- | --- | --- |
|  | 'Old' | 'New' | 'Old' | 'New' (Reference levels) |
| $f_{tr}$ (GHz) | 6 | 6 | 10 | 6 |
| Incident power density (W/m2) $f >= f_{tr}$ | 10 | 10 | 10 | 55*f^-0.177 30 (at 28 GHz) 28 (at 39 GHz) |
| Averaging area | 1 cm2 | 4 cm2 | 20 cm2 | 4 cm2 up to 30 GHz and 1 cm2 above |

In above table, it is observed that the FCC regulation is tighter than ICNIRP limitation at 28 GHz.

To measure the RF exposure levels in human body, two antenna panels and 4Tx antenna elements per panel may be considered as shown in the below table, which shows NR UE parameters for measurements.

TABLE 31

| UE parameters | Unit | |
| --- | --- | --- |
| Operating band | | n260/n261 |
| # of antenna in an array (# of patches, # of dipoles, etc.) | | One 2 × 2 patch |
| # of arrays in total | | 2 |
| Antenna type (patch, dipole, or both) | | patch |
| Antenna location (front, back, top-side, left-side, right-side, bottom-side) | | Left & Right |
| Device case material (Plastic, Glass, Ceramic, Metal) | dB | Metal |
| Device size (3D) | cm3 | Over 150 mm of length |
| Legacy Antenna (w/Metal, Plastic Frame) | | Plastic |
| Display panel | Y/N | Y |
| Bezel Margin | Y/N | N/A |
| Gap between antenna & housing | mm | N/A |

Based on these regulatory limitation, the RF exposure level of NR UE is measured at n261/n260 operating bands.

TABLE 32

| Operating Band | Measured Condition | Test Distance | Test Grid Size | Uplink Duty Cycle | CH | AG0 (H) | AG1 (V) | AG0 + AG1 EIRP | Avg. Area [4 cm^2] PD (W/m^2) |
| --- | --- | --- | --- | --- | --- | --- | --- | --- | --- |
| n261 | Left side | 0 mm | 20 × 20 mm | 50.0% | Low | | | 20.4 | 21.6 |
| n261 | Front | 0 mm | 20 × 20 mm | 50.0% | Low | | | 20.4 | 10.2 |
| n261 | Rear | 0 mm | 20 × 20 mm | 50.0% | Low | | | 20.4 | 8.7 |
| n261 | Left side | 0 mm | 20 × 20 mm | 25% | Low | | | 17.4 | 10.8 |
| n261 | Front | 0 mm | 20 × 20 mm | 25% | Low | | | 17.4 | 5.03 |
| n261 | Rear | 0 mm | 20 × 20 mm | 25% | Low | | | 17.4 | 4.45 |
| n261 | Left side | 0 mm | 20 × 20 mm | 12.5% | Low | | | 14.4 | 5.4 |
| n261 | Front | 0 mm | 20 × 20 mm | 12.5% | Low | | | 14.4 | 2.54 |
| n261 | Rear | 0 mm | 20 × 20 mm | 12.5% | Low | | | 14.4 | 2.2 |
| n261 | Left side | 0 mm | 20 × 20 mm | 6.25% | Low | | | 11.4 | 2.8 |
| n260 | Left side | 0 mm | 20 × 20 mm | 50% | Low | | | 19.6 | 14.8 |
| n260 | Front | 0 mm | 20 × 20 mm | 50% | Low | | | 19.6 | 4.9 |
| n260 | Rear | 0 mm | 20 × 20 mm | 50% | Low | | | 19.6 | 4.2 |
| n260 | Left side | 0 mm | 20 × 20 mm | 25% | Low | | | 16.6 | 7.3 |
| n260 | Front | 0 mm | 20 × 20 mm | 25% | Low | | | 16.6 | 2.4 |
| n260 | Rear | 0 mm | 20 × 20 mm | 25% | Low | | | 16.6 | 2.0 |

Based on these measurement in the above table, the total required power reduction level is about 6 dB.

The NR UE at FR2 can be satisfy the MPE regulatory requirements as follow three options.

Option 1) Apply P-MPR with 6 dB and 100% max UplinkDutyCycle

Option 2) Apply P-MPR with 0 dB and 20% max UplinkDutyCycle

Option 3) Apply both P-MPR and maxUplinkDutyCycle depend on UE implementation

The below table lists the pros & cons for each options

TABLE 33

| Solution | Pros | Cons |
|---|---|---|
| Option1 | TDD UL/DL configuration is not restricted<br>Early released 5G UE easily satisfied the MPE | Shrink the cell coverage<br>Initial access is restricted area<br>RAN2 signalling is not support P-MPR reporting from UE |
| Option2 | Maintain the cell coverage<br>Initial access is not restricted area<br>RAN2 signalling is support maxUplinkDutyCycle reporting from UE<br>Early released 5G UE easily satisfied the MPE | TDD UL/DL configuration is restricted. |
| Option3 | Simple to satisfy MPE | RAN2 signalling is not support P-MPR reporting from UE<br>Early released UE do not provide any informations to NW for both P-MPR & maxUplinkDutyCycle |

The problem of the 100% maxUplinkDutyCycle as default value is that P-PMR always applied to satisfy the MPE regulatory requirements. It will be raised the cell coverage decreased problem. Then 5G UE initial access is quite difficult compare to NR FR1.

Also the early released NR UE without maxUplinkDutyCycle capability signaling in early market did not satisfy the MPE with 100% default value of maxUplinkDutyCycle. Then the early released 5G UE always applied P-MPR with certain dB, it quite impact to shrink the cell coverage.

However, if the 20% maxUplinkDutyCycle as default value is not necessary P-PMR level for compliance the MPE regulatory requirements. Also the early released 5G UE always satisfy MPE requirements for 20% default value of maxUplinkDutyCycle without P-MPR. Finally, it does not impact to the cell coverage.

This 20% default value of maxUplinkDutyCycle is derived as same approach when the default value of maxUplinkDutyCycle at FR1 is decided.

In other words, 50% default value was decided with P-MPR 0 dB for power class 2 UE at FR1 since network consider the default values without any P-MPR report from UE side.

Therefore, the present specification proposes the default value of maxUplinkDutyCycle at FR2 as following.

Proposal 1: The default value of maxUplinkDutyCycle should be decided with 20% duty cycle ratio. The minimum percentile of reporting range is 20%.

Based on the measurement results in the above table and the analysis, the required P-MPR and maxUplinkDutyCycle to meet the RF exposure requirements are shown in below table.

The below table shows combination of P-MPR and maxUplinkDutyCycle.

TABLE 34

| Operating Band | Total required Power reduction [dB] | $P\text{-}MPR_{f,c}$ [dB] | maxUplinkDutyCycle [%] | Note |
|---|---|---|---|---|
| n257, n258, n260, n261 | ≤6 dB | 0 | 20 <= maxUplinkDutyCycle <= 25 | Default value of maxUplinkDutyCycle is 20% with 0 dB P-MPR only |
| | | 3 | 25 < maxUplinkDutyCycle <= 50 | maxUplinkDutyCycle can be used to maintain cell coverage |
| | | 6 | 50 < maxUplinkDutyCycle <= 100 | |
| | ≥6 dB | X | 20 <= maxUplinkDutyCycle <= 100 | Both P-MPR & maxUplinkDutyCycle used to satisfy MPE regulatory requirements |

If the total required MPR level is larger than 6 dB, it is considered to use both P-MPR and the restricted maxUplinkDutyCycle for RF exposure limitation as shown in the above table. Then, P-MPR also need to specify the UE capability signaling.

It means that the applied P-MPR with certain dB in UE side is not reported network, then network can schedule the higher maximum power regardless of P-MPR level in cell edge region, then UE autonomously apply P-MPR, hence the UE can be released from network connection by network failure.

Based on these analyses, it is proposed as follow:

Proposal 2: it is proposed to use the restricted maxUplinkDutyCycle when the required total power reduction level is equal or less than about 6 dB (i.e., ±6 dB such as 5 dB or 7 dB). Both P-MPR and the restricted maxUplinkDutyCycle can be used for RF exposure limitation when the required total power reduction level is larger than about 6 dB (i.e., ±6 dB such as 5 dB or 7 dB).

Proposal 3: it is needed to specify information or parameters for P-MPR reporting, which are transmitted via the UE capability information.

Based on the proposal 3, as shown in FIG. 7, the wireless device may transmit the UE capability information which includes the RF parameters as follows:

TABLE 35

| RF-Parameters | |
| --- | --- |
| maxUplinkDutyCycle-PC3-FR2 | {n100, n90, n80, n70, n60, n50, n40, n30, n25, n20} |
| P-MPR-FR2 | {0, 1, 2, 3, 4, 5, 6} |
| pucch-SpatialRelInfoMAC-CE | {supported} |
| powerBoosting-pi2BPSK | {supported} |

TABLE 36

| RF-Parameters field descriptions | |
| --- | --- |
| appliedFreqBandListFilter | In this field the UE mirrors the FreqBandList that the NW provided in the capability enquiry, if any. The UE filtered the band combinations in the supportedBandCombinationList in accordance with this appliedFreqBandListFilter. The UE does not include this field if the UE capability is requested by E-UTRAN and the network request includes the field eutra-nr-only. |
| supportedBandCombinationList | A list of band combinations that the UE supports for NR (without MR-DC). The FeaturesetCombinationId:s in this list refer to the FeatureSetCombination entries in the featureSetCombinations list in the UE-NR-Capability IE. The UE does not include this field if the UE capability is requested by E-UTRAN and the network request includes the field eutra-nr-only. |

If the P-MPR is not included in UE capability information transmitted from the UE, then an uplink scheduling for the UE is always limited with maxUplinkDutyCycle due to no additional P-MPR signaling.

Thus, it is preferred to propose to calculate P-MPR from its reported maxUplinkDutyCycle as another feasible solutions considering implementation aspects.

$$P\text{-}MPR_{Calculated} = \max(10 * \log10(UplinkDutyCycle_{estimated}/maxUplinkDutyCycle), 0)[dB] \quad \text{Equation 2}$$

In the above Equation, maxUplinkDutyCycle is a reported value via the UE capability information and UplinkDutyCycle$_{estimated}$ means an estimated current uplink duty cycle within certain estimation window. In both gNB and UE side, this value can be easily estimated by counting UL grant for scheduling.

If gNB and UE assume same relationship between maxUplinkDutyCycle and P-MPR$_{Calculated}$, then NR FR2 UE can meet RF exposure limitation without any additional P-MPR signaling.

Also, since P-MPR$_{calculated}$ can be calculated dynamically, gNB and UE can have more scheduling flexibility.

Figure 8:
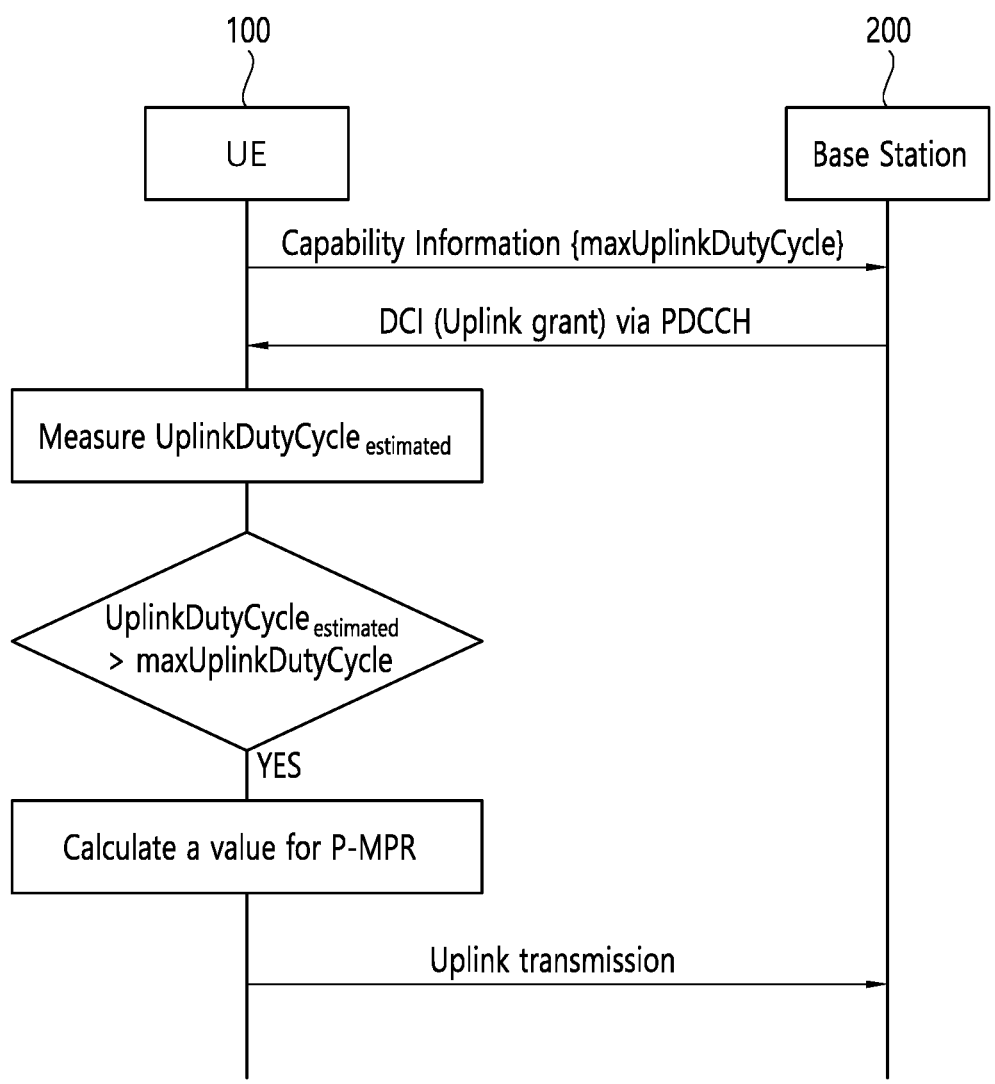
FIG. 8 shows an exemplary signal flow of the present disclosure.

FIG. 8 Shows an Exemplary Signal Flow of the Present Disclosure

Referring to FIG. 8, the wireless device (e.g., UE) 100 transmits UE capability information, which includes a maximum uplink duty cycle (e.g., maxUplinkDutyCycle), to the base station (e.g., gNB) 200.

The base station (e.g., gNB) 200 performs an uplink scheduling based on the capability information of the wireless device (e.g., UE) 100. In other words, the base station (e.g., gNB) 200 allocates uplink resources where the wireless device (e.g., UE) 100 transmits a PUSCH signal.

And then, the base station (e.g., gNB) 200 transmits, via a PDCCH, downlink control information (DCI) including an uplink grant. Here, the uplink grant includes information on the allocated uplink resources based on the uplink scheduling.

The wireless device (e.g., UE) 100 measures an uplink duty cycle, which is expressed as UplinkDutyCycle$_{estimated}$. Here, UplinkDutyCycle$_{estimated}$ means the estimated current uplink duty cycle within certain estimation window. The UplinkDutyCycle$_{estimated}$ may be estimated by using the allocated uplink resources based on the uplink scheduling.

The wireless device (e.g., UE) 100 compares the measured uplink duty cycle (i.e., UplinkDutyCycle$_{estimated}$) with the max uplink duty cycle (i.e., maxUplinkDutyCycle).

If the measured uplink duty cycle (i.e., UplinkDutyCycle$_{estimated}$) is greater than the max uplink duty cycle (i.e., maxUplinkDutyCycle) and if the wireless device (e.g., UE) 100 does not receive a signal including a value for the P-MPR, the wireless device itself (e.g., UE) 100 calculates the value for the P-MPR as the Equation 2.

Then, the wireless device (e.g., UE) 100 allocates a transmit power for transmitting the uplink signal via the PUSCH. And, the wireless device (e.g., UE) 100 reduces the allocated transmit power by the calculated value for the P-MPR.

The wireless device (e.g., UE) 100 transmits an uplink signal via a PUSCH at the transmit power which is reduced by the calculated value for the P-MPR.

Figure 9:
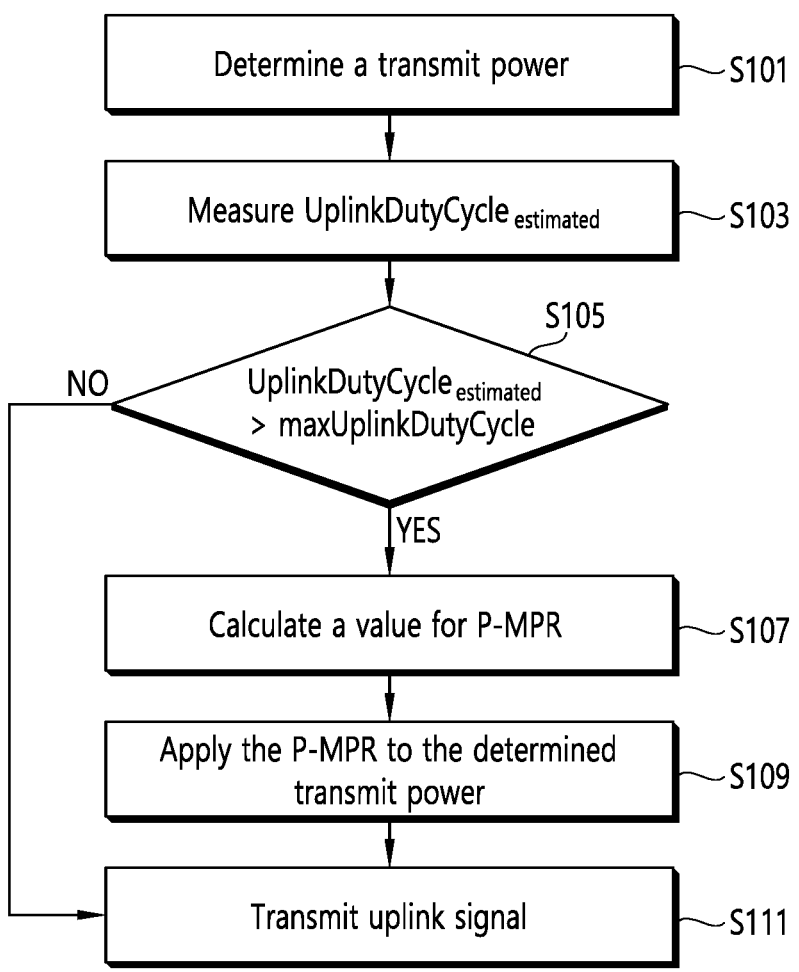
FIG. 9 shows an exemplary flow of the present disclosure.

FIG. 9 Shows an Exemplary Flow of the Present Disclosure

Referring to FIG. 9, at step S101, the wireless device (e.g., UE) 100 determines a transmit power for transmitting the uplink signal via the PUSCH.

At step 103, the wireless device (e.g., UE) 100 measures the uplink duty cycle, which is expressed as UplinkDutyCycle$_{estimated}$.

At step 105, the wireless device (e.g., UE) 100 compares the measured uplink duty cycle (i.e., UplinkDutyCycle$_{estimated}$) with the max uplink duty cycle (i.e., maxUplinkDutyCycle). Here, it is possible that the wireless device (e.g., UE) 100 may not transmit the max uplink duty cycle (i.e., maxUplinkDutyCycle) to the base station.

At step S107, the wireless device itself (e.g., UE) 100 calculates the value for the P-MPR as the Equation 2, if the measured uplink duty cycle (i.e., UplinkDutyCycle$_{estimated}$) is greater than the max uplink duty cycle (i.e., maxUplinkDutyCycle) and if the wireless device (e.g., UE) 100 does not receive a signal including a value for the P-MPR.

At step S109, the wireless device (e.g., UE) 100 applies the calculated value for the P-MPR to the determined transmit power.

At step S111, the wireless device (e.g., UE) 100 transmits an uplink signal via a PUSCH at the transmit power.

Communication System to Which the Disclosure of This Specification is to be Applied While not limited to thereto, the various descriptions, functions, procedures, suggestions, methods, and/or operational flowcharts of the present specification disclosed herein may be applied to in various fields requiring wireless communication/connection (e.g., 5G) between devices.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

Figure 10:
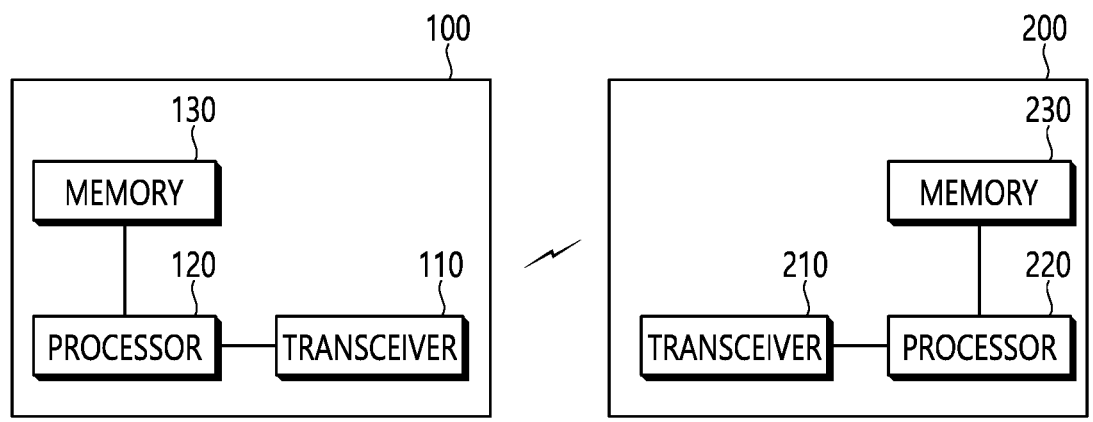
FIG. 10 is a block diagram illustrating a wireless device and a base station, by which the disclosure of this specification can be implemented.

FIG. 10 is a Block Diagram Illustrating a Wireless Device and a Base Station, by Which the Disclosure of This Specification can be Implemented Referring to FIG. 10, a wireless device 100 and a base station 200 may implement the disclosure of this specification.

The wireless device 100 includes a processor 120, a memory 130, and a transceiver 110. Likewise, the base station 200 includes a processor 220, a memory 230, and a transceiver 210. The processors 120 and 220, the memories 130 and 230, and the transceivers 110 and 210 may be implemented as separate chips, or at least two or more blocks/functions may be implemented through one chip.

Each of the transceivers 110 and 210 includes a transmitter and a receiver. When a particular operation is performed, either or both of the transmitter and the receiver may operate. Each of the transceivers 110 and 210 may include one or more antennas for transmitting and/or receiving a radio signal. In addition, each of the transceivers 110 and 210 may include an amplifier configured for amplifying a Rx signal and/or a Tx signal, and a band pass filter for transmitting a signal to a particular frequency band.

Each of the processors 120 and 220 may implement functions, procedures, and/or methods proposed in this specification. Each of the processors 120 and 220 may include an encoder and a decoder. For example, each of the processors 120 and 230 may perform operations described above. Each of the processors 120 and 220 may include an application-specific integrated circuit (ASIC), a different chipset, a logic circuit, a data processing device, and/or a converter which converts a base band signal and a radio signal into each other.

Each of the memories 130 and 230 may include a Read-Only Memory (ROM), a Random Access Memory (RAM), a flash memory, a memory card, a storage medium, and/or any other storage device.

Figure 11:
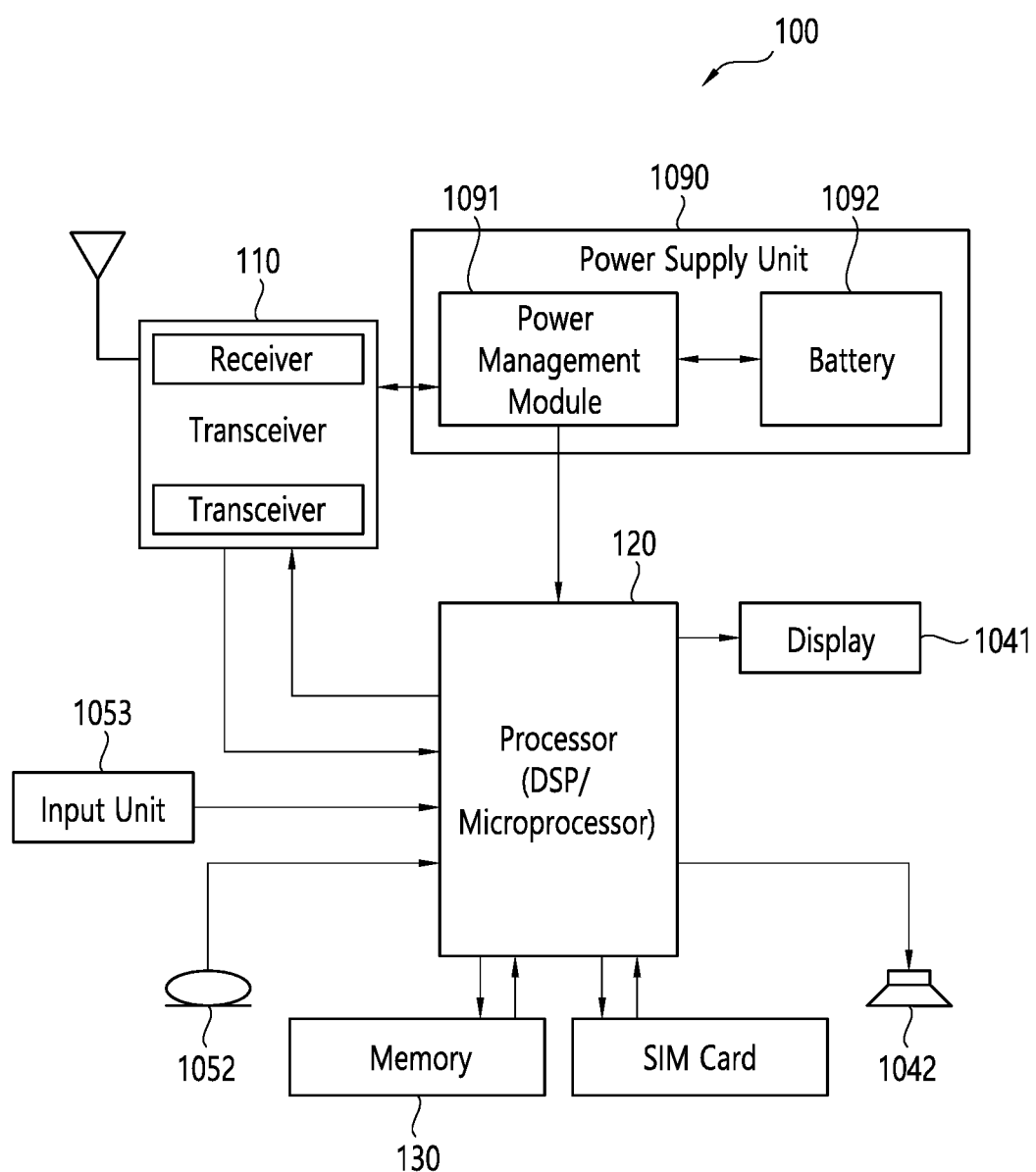
FIG. 11 is a block diagram showing a detail structure of the wireless device shown in FIG. 10.

FIG. 11 is a Block Diagram Showing a Detail Structure of the Wireless Device Shown in FIG. 10

In particular, FIG. 11 shows an example of the wireless device of FIG. 10 in greater detail.

A wireless device includes a memory 130, a processor 120, a transceiver 110, a power management module 1091, a battery 1092, a display 1041, an input unit 1053, a speaker 1042, a microphone 1052, a subscriber identification module (SIM) card, and one or more antennas.

The processor 120 may be configured to implement the proposed functions, procedures, and/or methods described in the present specification. Layers of a radio interface protocol may be implemented in the processor 120. The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

The power management module 1091 manages power for the processor 120 and/or the transceiver 110. The battery 1092 supplies power to the power management module 1091. The display 1041 outputs a result processed by the processor 120. The input unit 1053 receives an input to be used by the processor 120. The input unit 1053 may be displayed on the display 1041. The SIM card is an integrated circuit used to safely store an international mobile subscriber identity (IMSI) used to identify and authenticate a subscriber and a key related thereto in a portable phone and a portable phone device such as a computer. Contacts information may be stored in many SIM cards.

The memory 130 is operatively coupled to the processor 120, and stores a variety of information for operating the processor 120. The memory 130 may include a read-only memory (ROM), a random access memory (RAM), a flash memory, a memory card, a storage medium, and/or other equivalent storage devices. When the embodiment is implemented in software, the techniques explained in the present specification can be implemented with a module (i.e., procedure, function, etc.) for performing the functions explained in the present specification. The module may be stored in the memory 130 and may be performed by the processor 120. The memory 130 may be implemented inside the processor 120. Alternatively, the memory 130 may be implemented outside the processor 120, and may be coupled to the processor 120 in a communicable manner by using various well-known means.

The transceiver 110 is operatively coupled to the processor 120, and transmits and/or receives a radio signal. The transceiver 110 includes a transmitter and a receiver. The transceiver 110 may include a baseband signal for processing a radio frequency signal. The transceiver controls one or more antennas to transmit and/or receive a radio signal. In order to initiate communication, the processor 120 transfers command information to the transceiver 110, for example, to transmit a radio signal constituting voice communication data. The antenna serves to transmit and receive a radio signal. When the radio signal is received, the transceiver 110 may transfer a signal to be processed by the processor 120, and may convert the signal into a baseband signal. The processed signal may be converted into audible or readable information which is output through the speaker 1042.

The speaker 1042 outputs a result related to a sound processed by the processor 120. The microphone 1052 receives a sound-related input to be used by the processor 120.

A user presses (or touches) a button of the input unit 1053 or drives voice (activates voice) by using the microphone 1052 to input command information such as a phone number or the like. The processor 120 receives the command information, and performs a proper function such as calling the phone number or the like. Operational data may be extracted from the SIM card or the memory 130. In addition, the processor 120 may display command information or operational information on the display 1041 for user's recognition and convenience.

Figure 12:
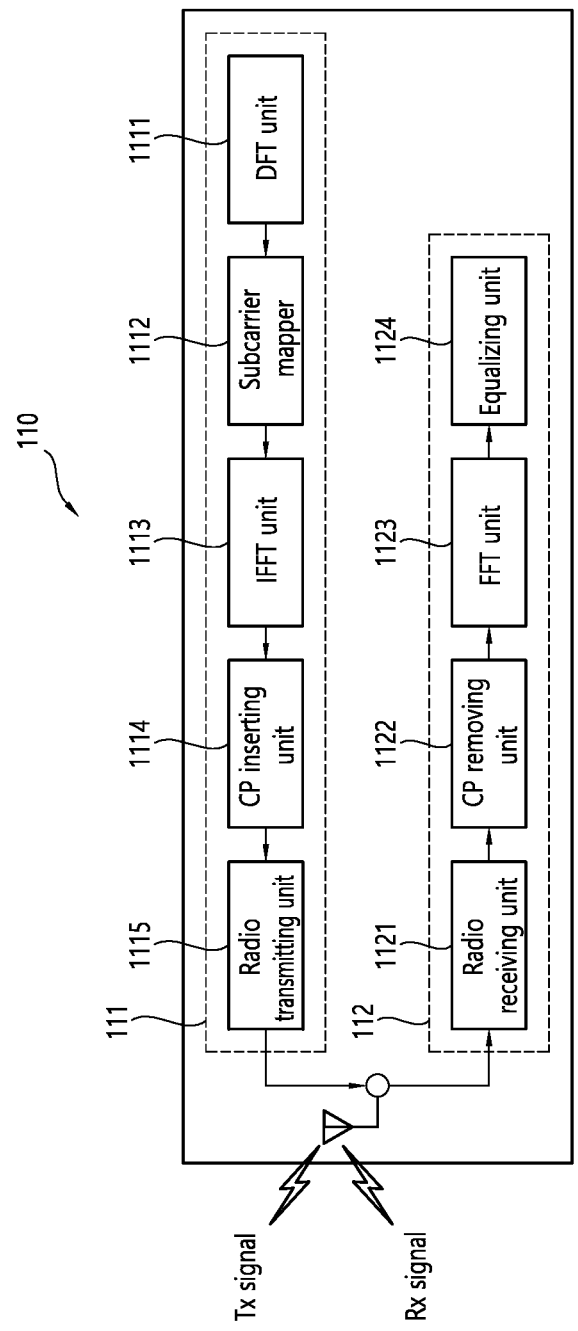
FIG. 12 is a detailed block diagram illustrating a transceiver of the wireless device shown in FIG. 10 and FIG. 11.

FIG. 12 is a Detailed Block Diagram Illustrating a Transceiver of the Wireless Device Shown in FIG. 10 and FIG. 11

Referring to FIG. 12, a transceiver 110 includes a transmitter 111 and a receiver 112. The transmitter 111 includes a Discrete Fourier Transform (DFT) unit 1111, a subcarrier mapper 1112, an IFFT unit 1113, a CP insertion unit 1114, a wireless transmitter 1115. In addition, the transceiver 1110 may further include a scramble unit (not shown), a modulation mapper (not shown), a layer mapper (not shown), and a layer permutator, and the transceiver 110 may be disposed in front of the DFT unit 1111. That is, in order to prevent a peak-to-average power ratio (PAPR) from increasing, the transmitter 111 may transmit information to pass through the DFT unit 1111 before mapping a signal to a subcarrier. A signal spread (or pre-coded for the same meaning) by the DFT unit 111 is subcarrier-mapped by the subcarrier mapper 1112, and then generated as a time domain signal by passing through the IFFT unit 1113.

The DFT unit 111 performs DFT on input symbols to output complex-valued symbols. For example, if Ntx symbols are input (here, Ntx is a natural number), a DFT size may be Ntx. The DFT unit 1111 may be called a transform precoder. The subcarrier mapper 1112 maps the complex-valued symbols to subcarriers of a frequency domain. The complex-valued symbols may be mapped to resource elements corresponding to a resource block allocated for data transmission. The subcarrier mapper 1112 may be called a resource element mapper. The IFFT unit 113 may perform IFFT on input symbols to output a baseband signal for data, which is a time-domain signal. The CP inserter 1114 copies a rear portion of the baseband signal for data and inserts the copied portion into a front part of the baseband signal. The CP insertion prevents Inter-Symbol Interference (ISI) and Inter-Carrier Interference (ICI), and therefore, orthogonality may be maintained even in multi-path channels.

Meanwhile, the receiver 112 includes a wireless receiver 1121, a CP remover 1122, an FFT unit 1123, and an equalizer 1124, and so on. The wireless receiver 1121, the CP remover 1122, and the FFT unit 1123 of the receiver 112 performs functions inverse to functions of the wireless transmitter 1115, the CP inserter 1114, and the IFFT unit 113 of the transmitter 111. The receiver 112 may further include a demodulator.

Figure 13:
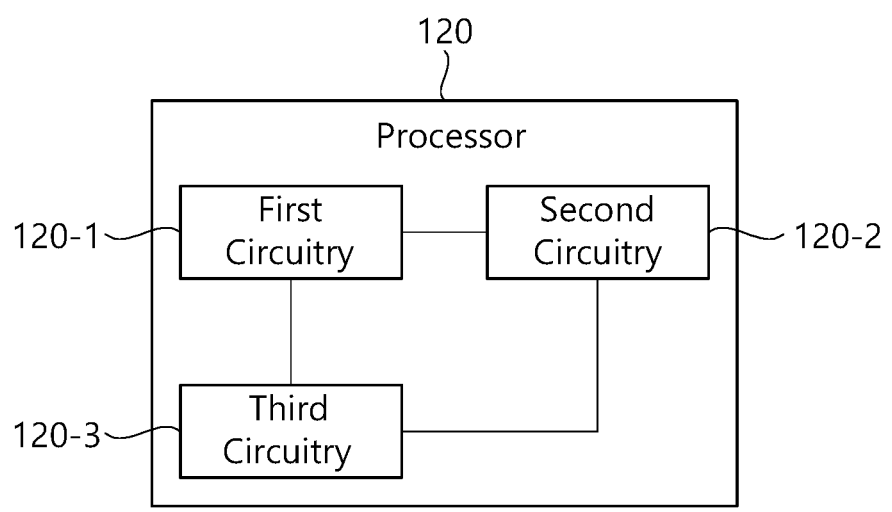
FIG. 13 illustrates a detailed block diagram illustrating a processor of the wireless device shown in FIG. 10 and FIG. 11.
Figure 14:
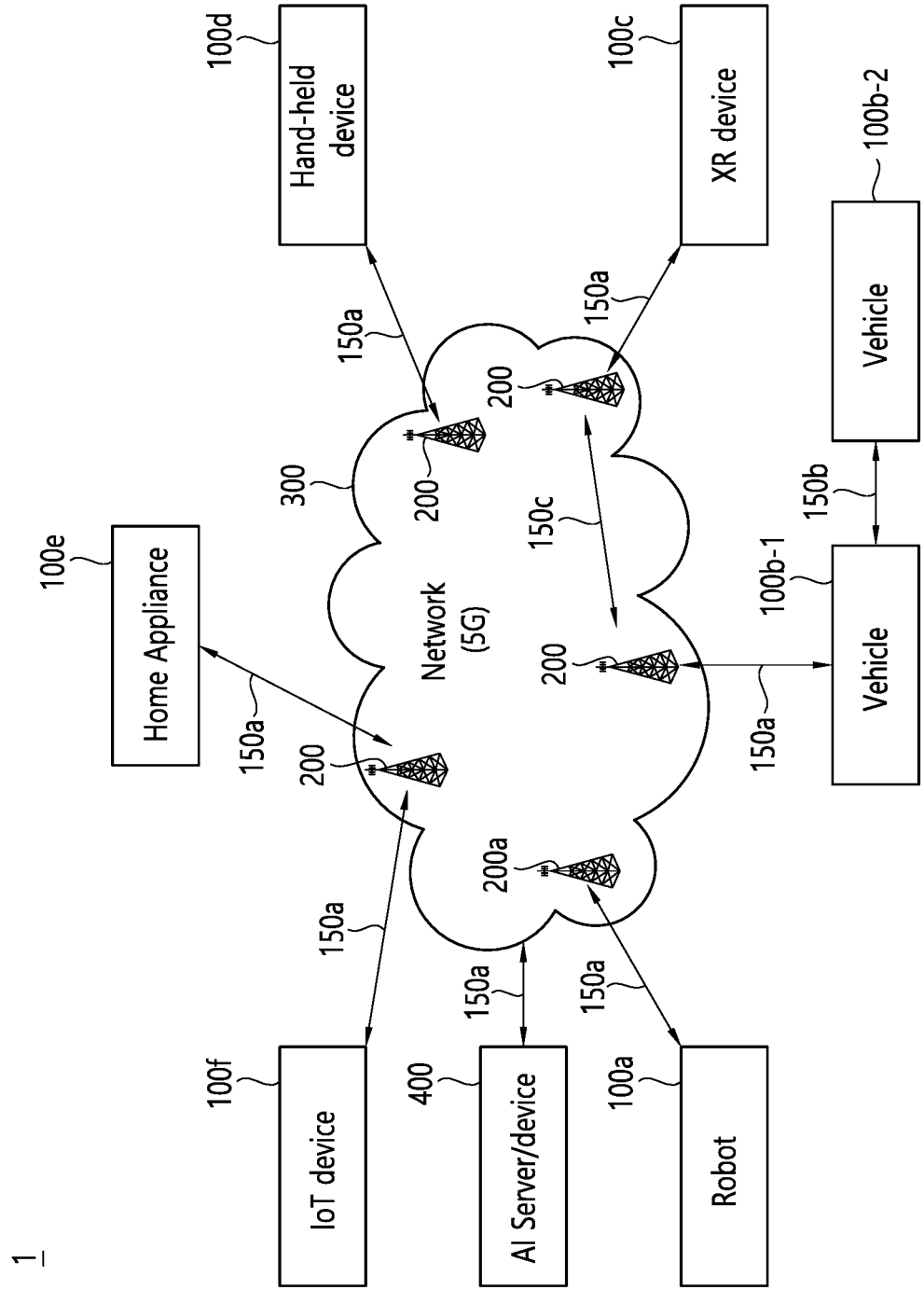
FIG. 14 illustrates a communication system that can be applied to the present specification.

FIG. 13 Illustrates a Detailed Block Diagram Illustrating a Processor of the Wireless Device Shown in FIG. 10 and FIG. 11

Referring to FIG. 13, the processor 120 as illustrated in FIG. 10 and FIG. 11 may comprise a plurality of circuitries such as. a first circuitry 120-1, a second circuitry 120-2 and a third circuitry 120-3.

The plurality of circuitries may be configured to implement the proposed functions, procedures, and/or methods described in the present specification.

The processor 120 may include application-specific integrated circuits (ASICs), other chipsets, logic circuits, and/or data processing units. The processor 120 may be an application processor (AP). The processor 120 may include at least one of a digital signal processor (DSP), a central processing unit (CPU), a graphics processing unit (GPS), and a modulator and demodulator (modem). An example of the processor 120 may include an SNAPDRAGON™ series processor manufactured by Qualcomm®, an EXYNOS™ series processor manufactured by Samsung®, an A series processor manufactured by Apple®, a HELIO™ series processor manufactured by MediaTek®, an ATOM™ series processor manufactured by INTEL®, or a corresponding next-generation processor.

Hereinafter, a communication system to which the present specification can be applied is described in more detail with reference to the drawings. The same reference numerals in the following drawings/descriptions may illustrate the same or corresponding hardware blocks, software blocks, or functional blocks unless otherwise indicated.

FIG. 15 Illustrates a Communication System That Can be Applied to the Present Specification Referring to FIG. 15, a communication system applied to the present specification includes a wireless device, a base station, and a network. Here, the wireless device means a device that performs communication using a wireless access technology (e.g., 5G New RAT (Long Term), Long Term Evolution (LTE)), and may be referred to as a communication/wireless/5G device.

Although not limited thereto, the wireless device may include a robot 100a, a vehicle 100b-1, 100b-2, an eXtended Reality (XR) device 100c, a hand-held device 100d, a home appliance 100e, an Internet of Thing (IoT) device 100f, and the AI device/server 400. For example, the vehicle may include a vehicle having a wireless communication function, an autonomous vehicle, a vehicle capable of performing inter-vehicle communication, and the like.

Here, the vehicle may include an unmanned aerial vehicle (UAV) (e.g., a drone). XR device may include AR (Augmented Reality)/VR (Virtual Reality)/MR (Mixed Reality) device. XR device may be implemented in the form of Head-Mounted Device (HMD), Head-Up Display (HUD), television, smartphone, a computer, a wearable device, a home appliance, a digital signage, a vehicle, a robot, and the like.

The mobile device may include a smartphone, a smart pad, a wearable device (e.g., smart watch, smart glasses), and a computer (e.g., a laptop, etc.). The home appliance may include a TV, a refrigerator, a washing machine, and the like. IoT devices may include sensors, smart meters, and the like. For example, the base station and the network may be implemented as a wireless device, and the specific wireless device 200a may operate as a base station/network node to other wireless devices.

The wireless devices 100a to 100f may be connected to the network 300 through the base station 200. AI (Artificial Intelligence) technology may be applied to the wireless devices 100a to 100f, and the wireless devices 100a to 100f may be connected to the AI server 400 through the network 300.

The network 300 may be configured using a 3G network, a 4G (e.g. LTE) network, a 5G (e.g. NR) network, or the like. The wireless devices 100a-100f may communicate with each other via the base station 200/network 300, but may also communicate directly (e.g. sidelink communication) without passing through the base station/network. For example, the vehicles 100b-1 and 100b-2 may perform direct communication (e.g. vehicle to vehicle (V2V)/vehicle to everything (V2X) communication). In addition, the IoT device (e.g. sensor) may directly communicate with another IoT device (e.g. sensor) or another wireless device 100a to 100f.

A wireless communication/connection 150a, 150b, 150c may be performed between the wireless devices 100a-100f/base station 200 and base station 200/base station 200. Here, the wireless communication/connection is implemented based on various wireless connections (e.g., 5G NR) such as uplink/downlink communication 150a, sidelink communication 150b (or D2D communication), inter-base station communication 150c (e.g. relay, integrated access backhaul), and the like.

The wireless device and the base station/wireless device, the base station, and the base station may transmit/receive radio signals to each other through the wireless communication/connections 150a, 150b, and 150c. For example, wireless communications/connections 150a, 150b, 150c may transmit/receive signals over various physical channels. To this end, based on various proposals of the present specification, At least some of various configuration information setting processes for transmitting/receiving a wireless signal, various signal processing processes (e.g., channel encoding/decoding, modulation/demodulation, resource mapping/demapping, etc.) may be performed.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for determining an uplink transmit power, the method performed by a user equipment (UE) and comprising:
   measuring an uplink duty cycle;
   comparing the measured uplink duty cycle with a maximum uplink duty cycle;
   calculating a value for a power management UE maximum power reduction (P-MPR), based on that the measured uplink duty cycle is greater than the maximum uplink duty cycle; and
   determining the uplink transmit power based on the calculated value for P-MPR.

2. The method of claim 1, wherein the uplink duty cycle represents a percentage of uplink symbols transmitted within a first time period.

3. The method of claim 1, wherein the maximum uplink duty cycle represents a radio of uplink symbols within time division duplex (TDD) uplink symbols and downlink symbols.

4. The method of claim 1, wherein the calculated value for the P-MPR is applied to satisfy a power exposure requirement.

5. The method of claim 1, further comprising:
   transmitting UE capability information including information on the maximum uplink duty cycle.

6. The method of claim 1, wherein the determining the uplink transmit power includes:
   determining the uplink transmit power; and
   applying the calculated value for P-MPR to the uplink transmit power.

7. The method of claim 6, wherein the applying the value for the P-MPR includes:
   reducing the value for the P-MPR from the uplink transmit power.

8. The method of claim 1, wherein the maximum uplink duty cycle is defined for a frequency range (FR) 2.

9. The method of claim 8, wherein the FR2 includes a n257 band, a n258 band, a n259 band, a n260 band and a n261 band.

10. An apparatus for determining an uplink transmit power, comprising:
    at least one processor; and
    at least one computer memory connected to the at least one processor and storing instructions that, when executed by the at least one processor, perform operations comprising:
    measuring an uplink duty cycle;
    comparing the measured uplink duty cycle with a maximum uplink duty cycle;
    calculating a value for a power management UE maximum power reduction (P-MPR), based on that the measured uplink duty cycle is greater than the maximum uplink duty cycle; and
    determining the uplink transmit power based on the calculated value for P-MPR.

11. The apparatus of claim 10, wherein the uplink duty cycle represents a percentage of uplink symbols transmitted within a first time period.

12. The apparatus of claim 10, wherein the maximum uplink duty cycle represents a radio of uplink symbols within time division duplex (TDD) uplink symbols and downlink symbols.

13. The apparatus of claim 10, wherein the calculated value for the P-MPR is applied to satisfy a power exposure requirement.

14. The apparatus of claim 10, wherein the determining the uplink transmit power includes:
   determining the uplink transmit power; and
   applying the calculated value for P-MPR to the uplink transmit power.

* * * * *